(12) United States Patent
Suzuki et al.

(10) Patent No.: US 12,193,347 B2
(45) Date of Patent: Jan. 14, 2025

(54) WORK VEHICLE

(71) Applicant: Yanmar Power Technology Co., Ltd., Osaka (JP)

(72) Inventors: Akihiro Suzuki, Osaka (JP); Akihiro Nakahata, Osaka (JP); Yoshiharu Mizukura, Osaka (JP); Keita Kitano, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 54 days.

(21) Appl. No.: 17/620,726

(22) PCT Filed: Jun. 17, 2020

(86) PCT No.: PCT/JP2020/023851
§ 371 (c)(1),
(2) Date: Dec. 19, 2021

(87) PCT Pub. No.: WO2020/256036
PCT Pub. Date: Dec. 24, 2020

(65) Prior Publication Data
US 2022/0408628 A1    Dec. 29, 2022

(30) Foreign Application Priority Data

Jun. 20, 2019    (JP) .................................. 2019-114952

(51) Int. Cl.
| H01Q 1/27 | (2006.01) |
| A01B 69/04 | (2006.01) |
| G05D 1/00 | (2006.01) |

(52) U.S. Cl.
CPC ......... *A01B 69/008* (2013.01); *G05D 1/0219* (2013.01); *G05D 1/0223* (2013.01);
(Continued)

(58) Field of Classification Search
None
See application file for complete search history.

(56) References Cited

U.S. PATENT DOCUMENTS

| 7,689,356 B2 * | 3/2010 | Dix ...................... G05D 1/0219 |
| | | 701/425 |
| 7,844,378 B2 * | 11/2010 | Lange .................... A01B 15/20 |
| | | 701/472 |

(Continued)

FOREIGN PATENT DOCUMENTS

| CN | 108040582 A | * 5/2018 | ........... A01D 34/412 |
| CN | 108762260 A | * 11/2018 | |

(Continued)

*Primary Examiner* — Aryan E Weisenfeld
*Assistant Examiner* — Kai Wang
(74) *Attorney, Agent, or Firm* — Chris Mizumoto

(57) ABSTRACT

This work vehicle has: a positioning unit for measuring the current position and the current direction of the vehicle body using a satellite positioning system; and an automatic travel control unit for executing automatic travel control based on positioning information from the positioning unit. The positioning unit comprises: a plurality of positioning antennas provided on the vehicle body; a plurality of positioning units for measuring the positions of the positioning antennas; a calculation unit for calculating the current position and the current direction of the vehicle body on the basis of positioning information from the positioning units; and a positioning state determination unit for determining whether or not the positioning state of the positioning units is a high-accuracy positioning state. When at least two positioning units are in the high accuracy positioning state, the positioning state determination unit permits the start of the automatic travel control.

4 Claims, 17 Drawing Sheets

(52) U.S. Cl.
CPC ........... *G05D 1/027* (2013.01); *G05D 1/0278* (2013.01); *G05D 1/028* (2013.01); *H01Q 1/27* (2013.01)

(56) References Cited

U.S. PATENT DOCUMENTS

| | | | | |
|---|---|---|---|---|
| 7,877,182 | B2* | 1/2011 | Dix | G05D 1/0219 |
| | | | | 701/50 |
| 8,489,290 | B1* | 7/2013 | Lange | G05D 1/0278 |
| | | | | 172/310 |
| 8,686,900 | B2* | 4/2014 | Whitehead | G01S 19/14 |
| | | | | 342/357.34 |
| 9,002,565 | B2* | 4/2015 | Jones | G01S 19/53 |
| | | | | 342/357.39 |
| 10,231,374 | B2* | 3/2019 | Sakaguchi | G01S 19/14 |
| 2007/0021913 | A1* | 1/2007 | Heiniger | G05D 1/0278 |
| | | | | 701/412 |
| 2008/0086249 | A1* | 4/2008 | Lange | G05D 1/0278 |
| | | | | 701/41 |
| 2009/0037041 | A1* | 2/2009 | Senneff | G05D 1/0219 |
| | | | | 701/23 |
| 2009/0265098 | A1* | 10/2009 | Dix | G05D 1/0278 |
| | | | | 701/23 |
| 2013/0166132 | A1* | 6/2013 | Matthews | A01B 69/008 |
| | | | | 707/705 |
| 2017/0367252 | A1* | 12/2017 | Sakaguchi | A01B 69/008 |

FOREIGN PATENT DOCUMENTS

| | | | | |
|---|---|---|---|---|
| WO | WO-2018214977 | A1 * | 11/2018 | ............ A01D 34/00 |
| WO | WO-2019096264 | A1 * | 5/2019 | ............ A01D 34/008 |

\* cited by examiner

WORK VEHICLE

CROSS-REFERENCE

This application is a US National Stage Application under 35 U.S.C. § 371 of International Application No. PCT/JP2020/023851 filed Jun. 17, 2020, which claims foreign priority of JP2019-114952 filed Jun. 20, 2019, the disclosures of which are hereby incorporated by reference in their entirety.

TECHNICAL FIELD

The present invention relates to a work vehicle capable of automatic travel in a work site.

BACKGROUND ART

As a work vehicle, some work vehicles are configured to include a position calculation means that measures a position of a vehicle body using a satellite positioning system, an orientation sensor that detects an orientation of the vehicle body, an automatic travel means that causes the work vehicle to automatically travel, and a control device and to automatically travel in accordance with a target path (a set travel path) stored in a memory of the control device (see, for example, Patent Literature 1).

CITATION LIST

Patent Literature

Patent Literature 1: International Publication No. 2015/147111

DISCLOSURE OF INVENTION

Problems to be Solved by the Invention

A work vehicle described in Patent Literature 1 includes a single mobile GPS antenna that receives radio waves from GPS satellites. A position calculation means measures A position of a vehicle body using radio waves received by the single mobile GPS antenna or the like. An automatic travel means causes the work vehicle to automatically travel in accordance with a target path, based on the position of the vehicle body measured by the position calculation means and an orientation of the vehicle body detected by an orientation sensor.

A geomagnetic sensor capable of calculating an absolute orientation may be employed as the orientation sensor. However, if a work site of the work vehicle is a farm, such as an orchard or the like, where there are structures, such as metal poles, wires, or the like, that are noise sources for the geomagnetic sensor, there is a probability that it is not possible to ensure sufficient accuracy in calculating the absolute orientation depending on conditions.

Therefore, the work vehicle may include, instead of the orientation sensor, an inertial measurement device. However, since the inertial measurement device uses a three-axis gyroscope and a three-direction acceleration sensor to measure the orientation of the vehicle body, in a case where the work vehicle is turning at low speed, an output value of each sensor is small, and measurement accuracy of the orientation of the vehicle body is reduced depending on conditions of a noise cut filter in some cases.

It is also possible to obtain a movement vector of the vehicle body from the position of the vehicle body measured by the position calculation means to calculate the orientation of the vehicle body from the movement vector. However, in this case, the smaller a turning radius during turning becomes, the more difficult it becomes to calculate the movement vector of the vehicle body, and therefore, it is not possible to calculate the orientation of the vehicle body with high accuracy from the movement vector of the vehicle body during turning in which the turning radium is small.

In other words, there is room for improvement in causing the work vehicle to automatically travel in accordance with the target path with high accuracy regardless of conditions of the work site or a travel state of the work vehicle.

In view of the above-described actual situation, it is a major object of the present invention to provide a work vehicle capable of automatically traveling in accordance with a target path with high accuracy regardless of conditions of a work site or a travel state of the work vehicle.

Means for Solving the Problems

A work vehicle according to the present invention includes a positioning unit that uses a satellite positioning system to measure current position and current orientation of a vehicle body, and an automatic travel control unit that executes automatic travel control to cause the vehicle body to automatically travel in accordance with a target path, based on positioning information from the positioning unit. The positioning unit includes a plurality of positioning antennas installed at different positions on the vehicle body, a plurality of positioning sections that measure the positions of the positioning antennas, a calculation unit that calculates the current position and current orientation of the vehicle body, based on positioning information from the positioning sections, and a positioning state determination unit that determines whether a positioning state of each of the positioning sections is a high-accuracy positioning state, and the positioning state determination unit permits start of the automatic travel control in a case where at least two of the positioning sections are in the high-accuracy positioning state.

According to the present invention, it is possible to provide a work vehicle capable of automatically traveling in accordance with a target path with high accuracy regardless of conditions of a work site or a travel state of the work vehicle.

BRIEF DESCRIPTION OF DRAWINGS

FIG. 10 is a block diagram illustrating a schematic configuration of an obstacle detection system and the like.

DESCRIPTION OF EMBODIMENTS

As an example of a form for carrying out the present invention, an embodiment in which the present invention is applied to a farm work vehicle that is an example of a work vehicle is described below with reference to the drawings. The present invention can be applied to, in addition to farm work vehicles, passenger work vehicles capable of automatic travel, such as, for example, tractors, passenger mowers, passenger rice transplanters, combines, snow plows, wheel loaders, transport vehicles, or the like, and unmanned work vehicles, such as unmanned cultivators and unmanned mowers.

Figure 1:
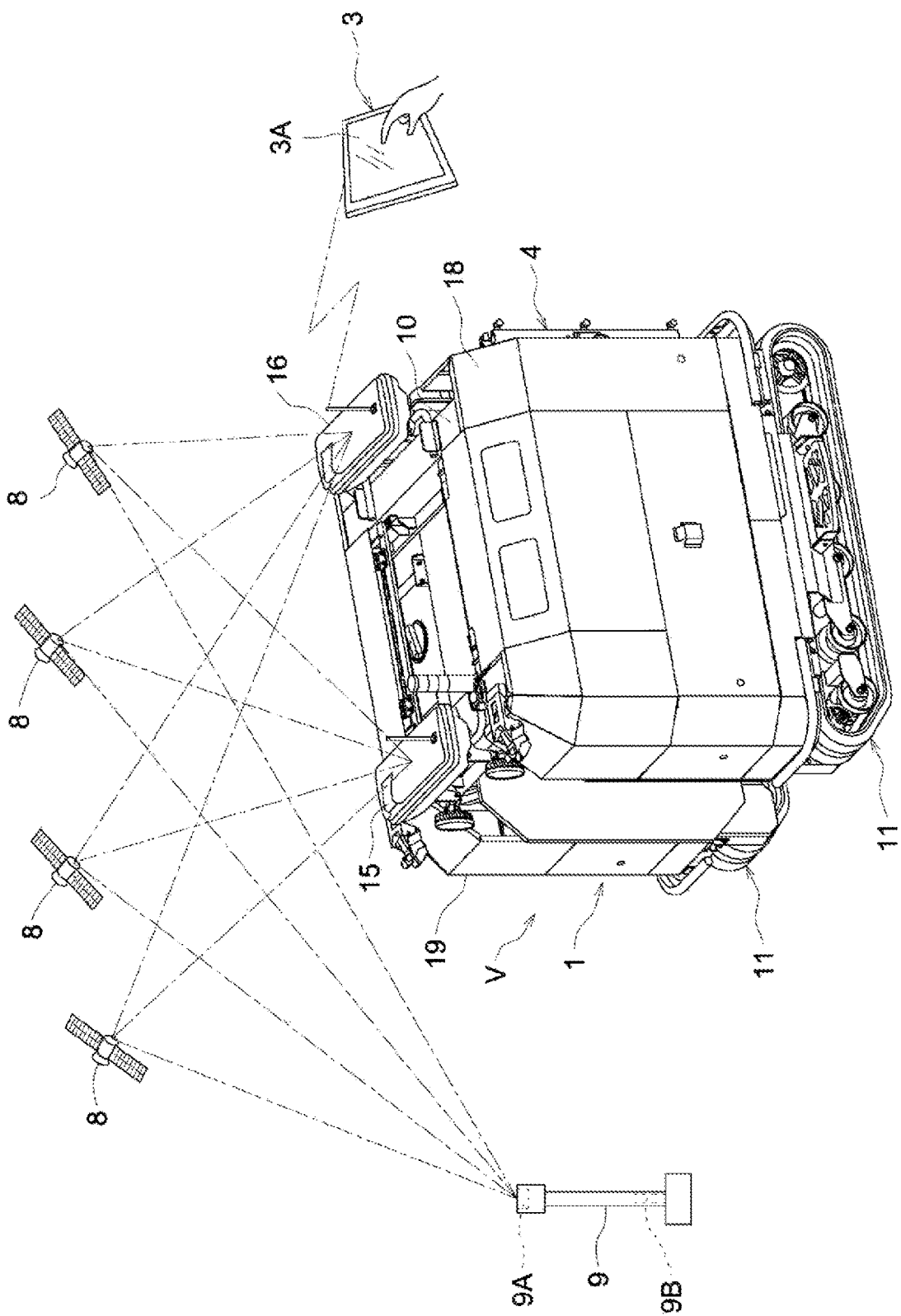
FIG. 1 is a schematic diagram illustrating a schematic configuration of an automatic travel system for a work vehicle.
Figure 2:
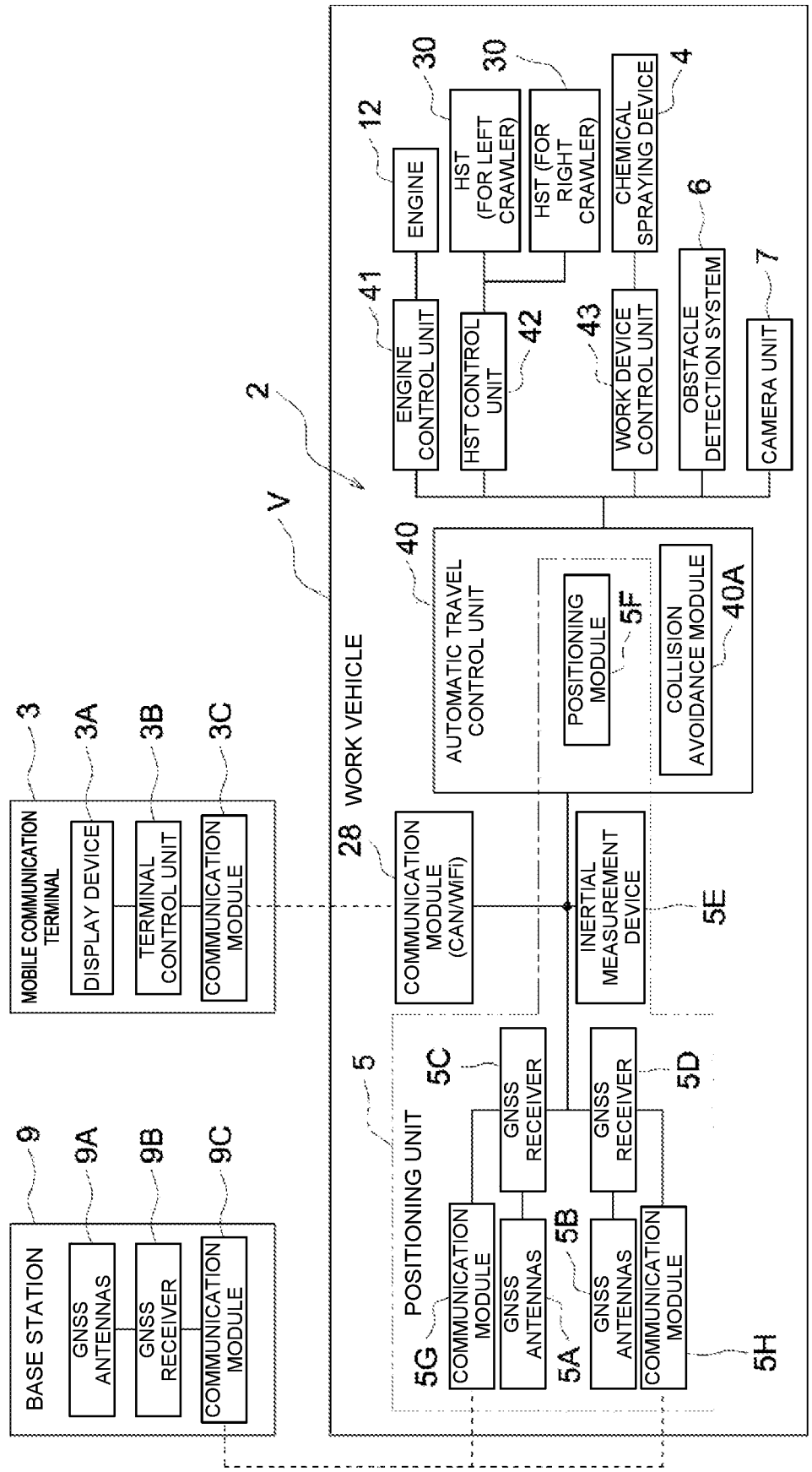
FIG. 2 is a block diagram illustrating a schematic configuration of the automatic travel system for a work vehicle.

As illustrated in FIGS. 1 to 2, a farm work vehicle V described in this embodiment is capable of automatic travel in a farm, such as a vineyard, a tea garden, or the like, that is an example of work sites by using an automatic travel system for a work vehicle. An automatic travel system for a work vehicle includes an automatic travel unit 2 mounted on a vehicle body 1 of the work vehicle V, a mobile communication terminal 3 that is an example of a wireless communication device set to be capable of wireless communication with the automatic travel unit 2, and the like. The mobile communication terminal 3 includes a multi-touch display device (for example, a liquid crystal panel) 3A or the like that enables display and input operations of various information related to automatic travel.

As illustrated in FIGS. 1 to 8, the work vehicle V includes a gate-type vehicle body 1 that travels straddling fruit trees, such as grape trees, apple trees, tea trees, or the like, planted in multiple lines in a farm, a chemical spraying device 4 that sprays chemical liquid on the trees as work targets, a positioning unit 5 that measures current position and current orientation of the vehicle body 1 using a global navigation satellite system (GNSS) that is an example of a satellite positioning system, an obstacle detection system 6 that monitors surroundings of the vehicle body 1 and detects an obstacle that exists around the vehicle body 1, a camera unit 7 that photographs front and rear sides of the vehicle body 1, and the like. The obstacle detection system 6 detects trees or the like planted in the farm as obstacles.

The work vehicle V can include, instead of or in addition to the chemical spraying device 4, a work device, such as a clipper-type plucking device that plucks trees as work targets, a cultivator that performs weeding and crushing on soil between trees, or the like. As the mobile communication terminal 3, an HMI tablet, a smartphone, or the like can be employed. As wireless communication, short-range wireless communication using a wireless local area network (LAN), such as Wi-Fi (registered trademark), Bluetooth (registered trademark), or the like can be employed.

As illustrated in FIG. 1 and FIGS. 3 to 8, the vehicle body 1 has a vehicle frame 10 formed in a gate shape in a view in a front-back direction and left and right crawlers 11 connected to left and right lower ends of the vehicle frame 10. An engine 12, a battery 13, and the like are mounted on a left side portion of the vehicle body 1. A right side portion of the vehicle body 1 is provided with an oil tank 14 made of a steel plate formed in a lateral L shape, a chemical tank 4A of a chemical spraying device 4, and the like. A ceiling of the vehicle body 1 is provided with a front antenna unit 15 arranged on a front portion of a ceiling, a rear antenna unit 16 arranged on a rear portion of the ceiling, a stacked indication lamp 17 that indicates a travel state of the vehicle body 1, and the like. The engine 12, the battery 13, and the like are covered by a left cover 18 forming a left outer surface of the vehicle body 1. The oil tank 14, the chemical tank 4A, and the like are covered by a right cover 19 forming a right outer surface of the vehicle body 1.

As illustrated in FIGS. 3 to 8, the vehicle body frame 10 has left and right side frames 20 arranged in parallel at predetermined intervals in a left-right direction, a front cross member 21 bridging between upper ends of the left and right side frames 20 at a front end, and a rear cross member 22 bridging between upper ends of the left and right side frames 20 at a rear end, and the like. Thus, the vehicle body frame 10 is formed in a gate shape with a space ensured between the left and right side frames 20 to allow passage of trees. An inner wall body 23 forming a corresponding one of left and right inner surfaces of the vehicle body 1 is attached to each of the left and right side frames 20.

As illustrated in FIGS. 4 to 7, each of the side frames 20 has a base member 20A extending in a front-rear direction of the vehicle body 1, a front pillar member 20B extending upwardly from a front end of the base member 20A, a rear pillar member 20C extending upwardly from a rear end of the base member 20A, and an upper side member 20D bridging between an upper end of the front pillar member 20B and an upper end of the rear pillar member 20C, and the like. Thus, the left and right side frames 20 are formed in a rectangular shape in a view in the left-right direction.

Figure 4:
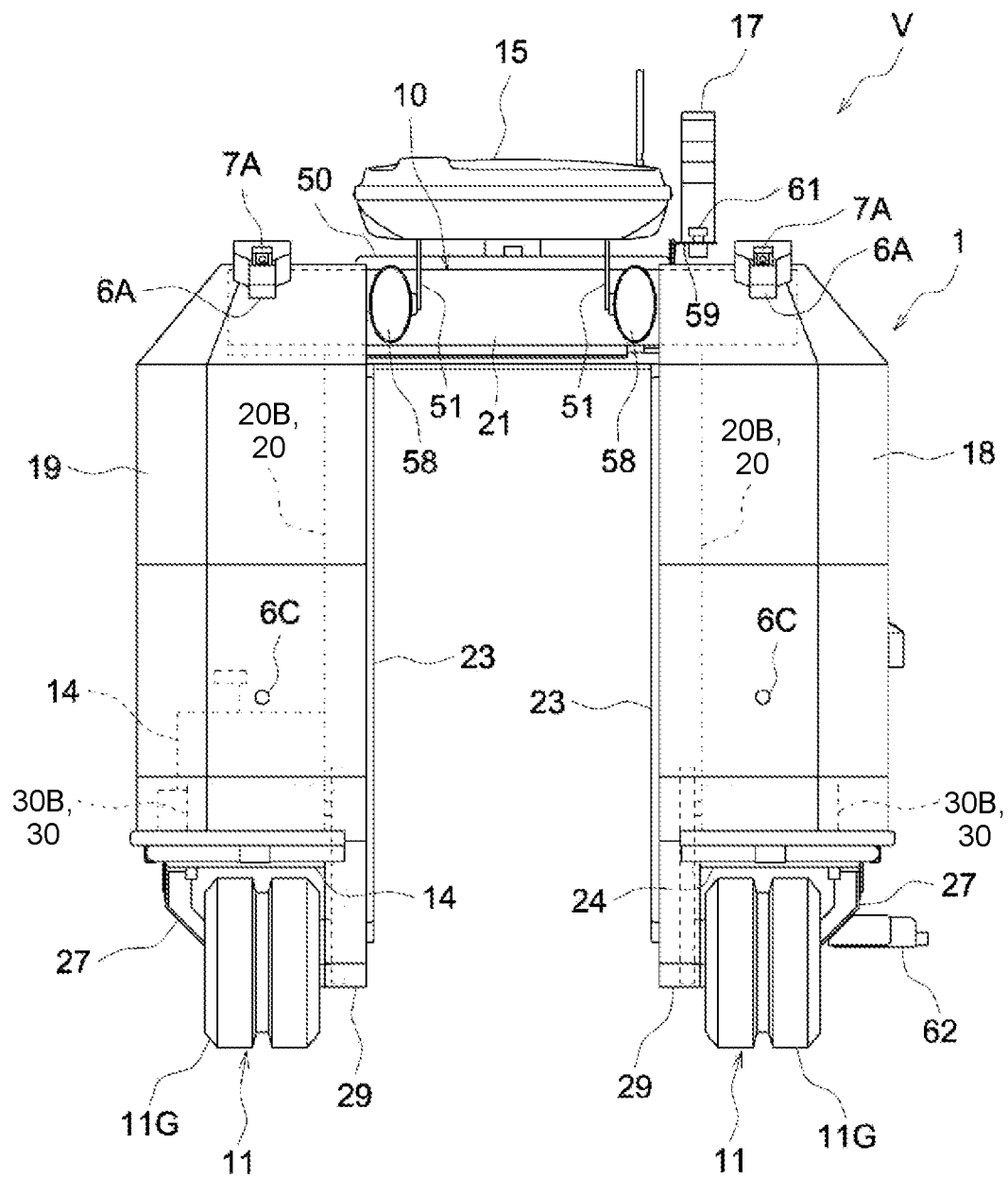
FIG. 4 is a front view illustrating the configuration of the farm work vehicle.
Figure 5:
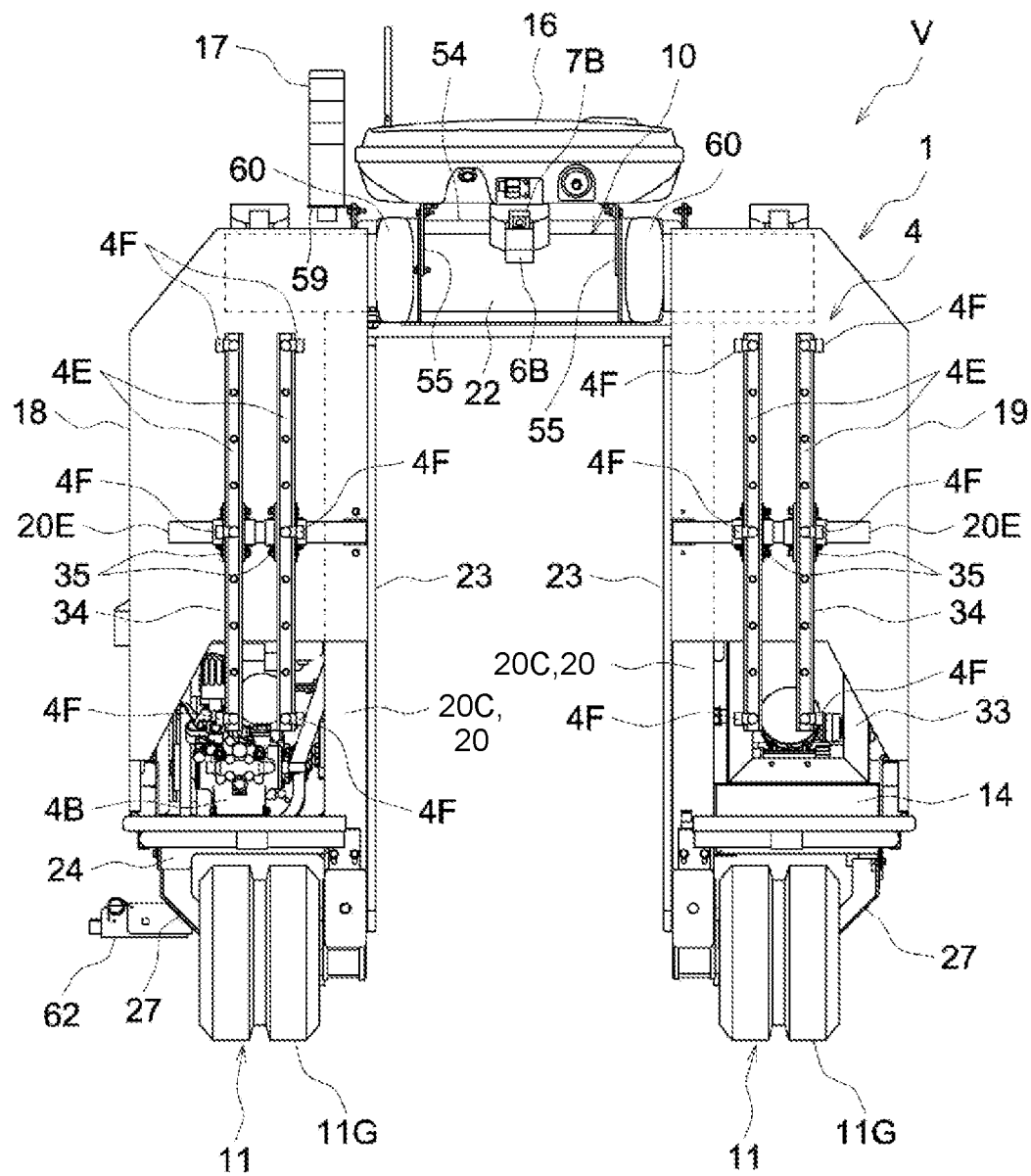
FIG. 5 is a rear view illustrating the configuration of the farm work vehicle.
Figure 6:
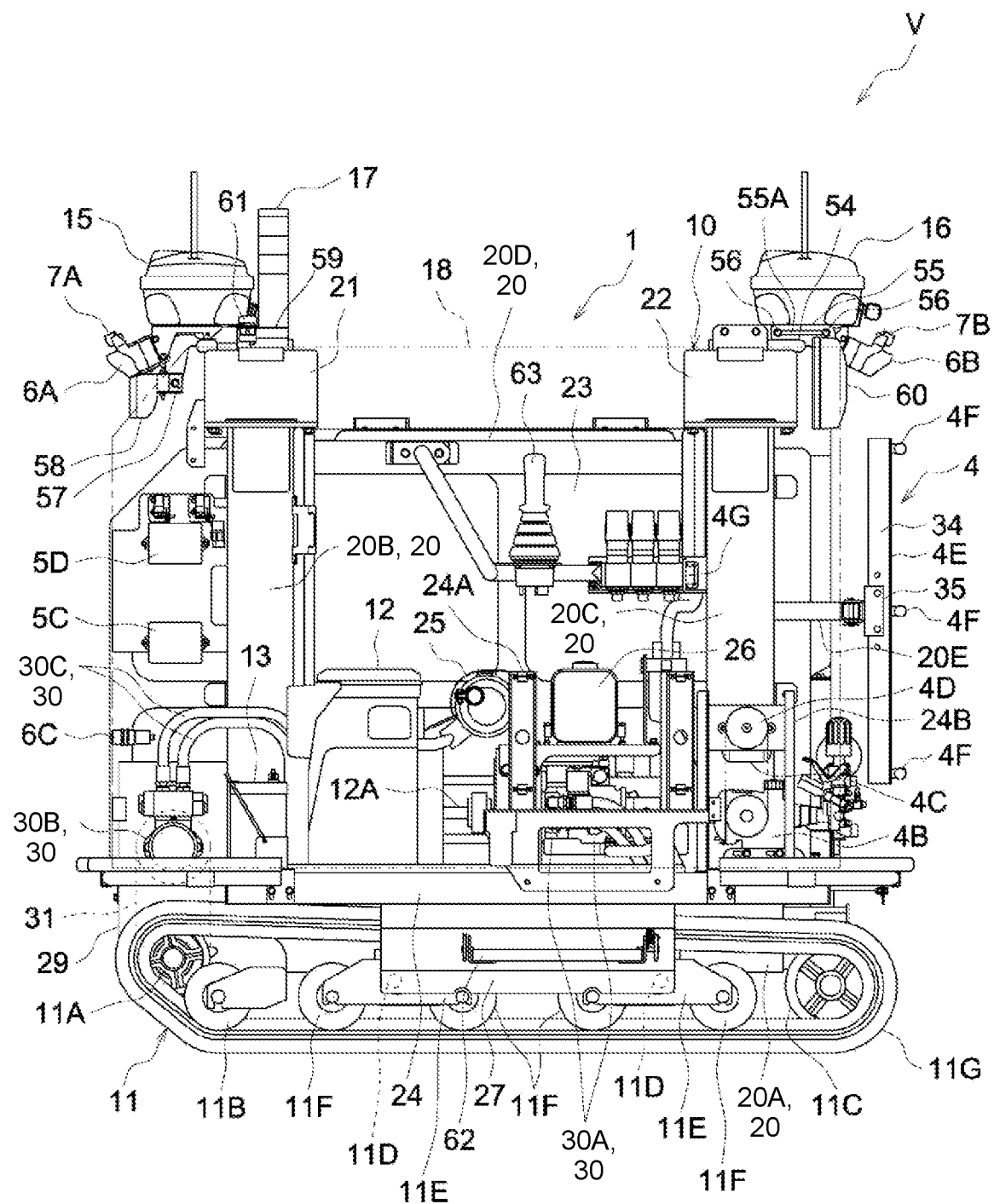
FIG. 6 is a right side view illustrating the configuration of the farm work vehicle with a left cover body removed.

As illustrated in FIGS. 3 to 6, of the left and right side frames 20, the left side frame 20 supports a loading stand 24 on which the engine 12, the battery 13, and the like are placed. The loading stand 24 is arranged directly above the left side crawler 11 in proximity to the crawler 11 by extending leftward from a lower portion of the left side frame 20. As illustrated in FIG. 6, the loading stand 24 is provided with a first support portion 24A that supports a muffler 25 and a fuel tank 26.

Figure 7:
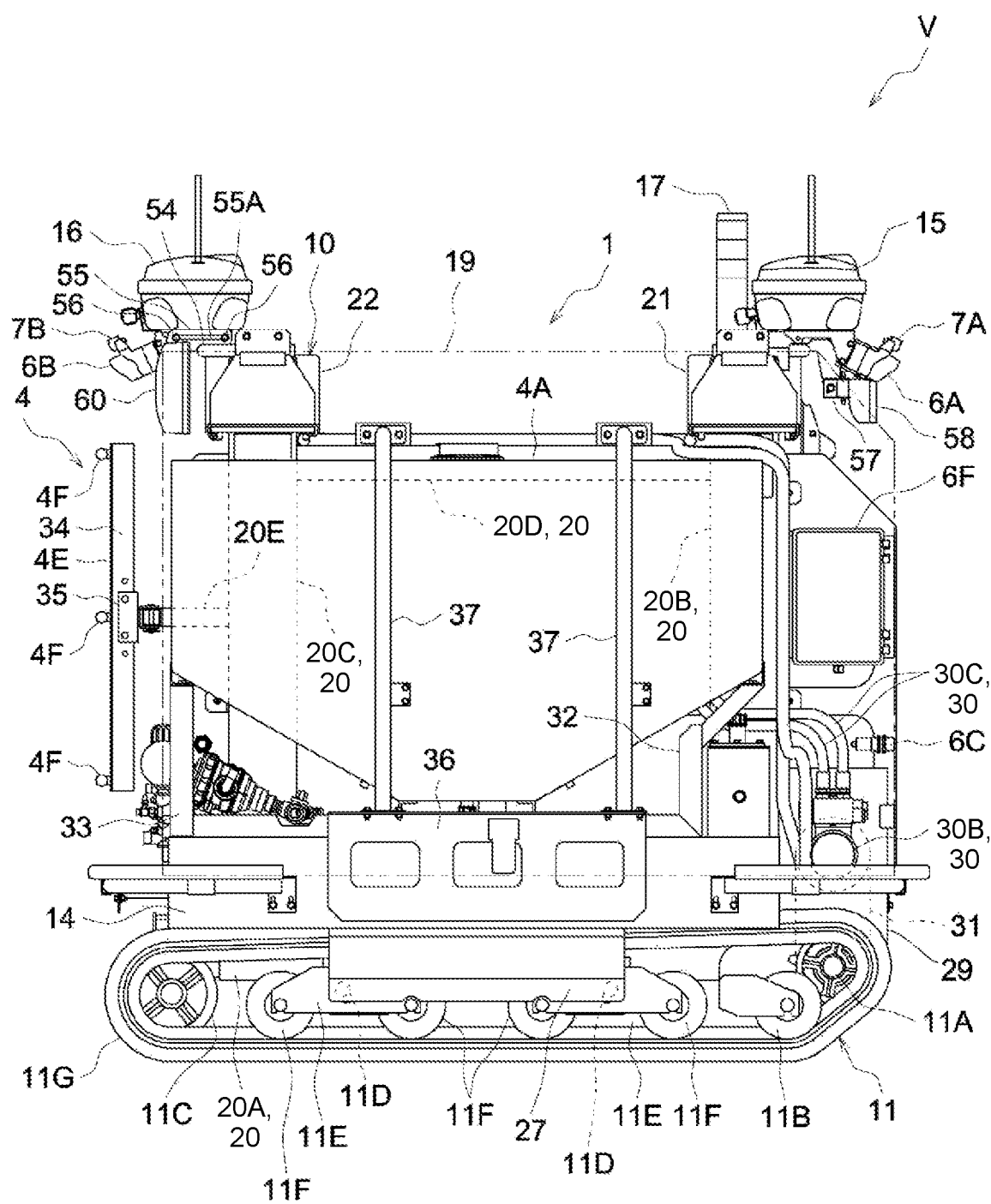
FIG. 7 is a left side view illustrating the configuration of the farm work vehicle with a right cover body removed.

As illustrated in FIGS. 4 to 5 and FIG. 7, the oil tank 14 is connected to the right side frame 20 with the oil tank 14 extending rightward from a lower portion of the right side frame 20. Thus, the oil tank 14 is arranged directly above the right side crawler 11 in proximity to the crawler 11.

That is, in the work vehicle V, the engine 12 and the battery 13 that are heavy, and the oil tank 14 that becomes heavy when oil is stored therein, and the like are arranged in a lower portion of the vehicle body 1 in a state of being divided into left and right. Thus, the work vehicle V is configured such that a center of gravity is made lower in a state where a left-right balance is achieved. As a result, the work vehicle V can stably perform contour travel or the like at a slope of a farm.

Figure 3:
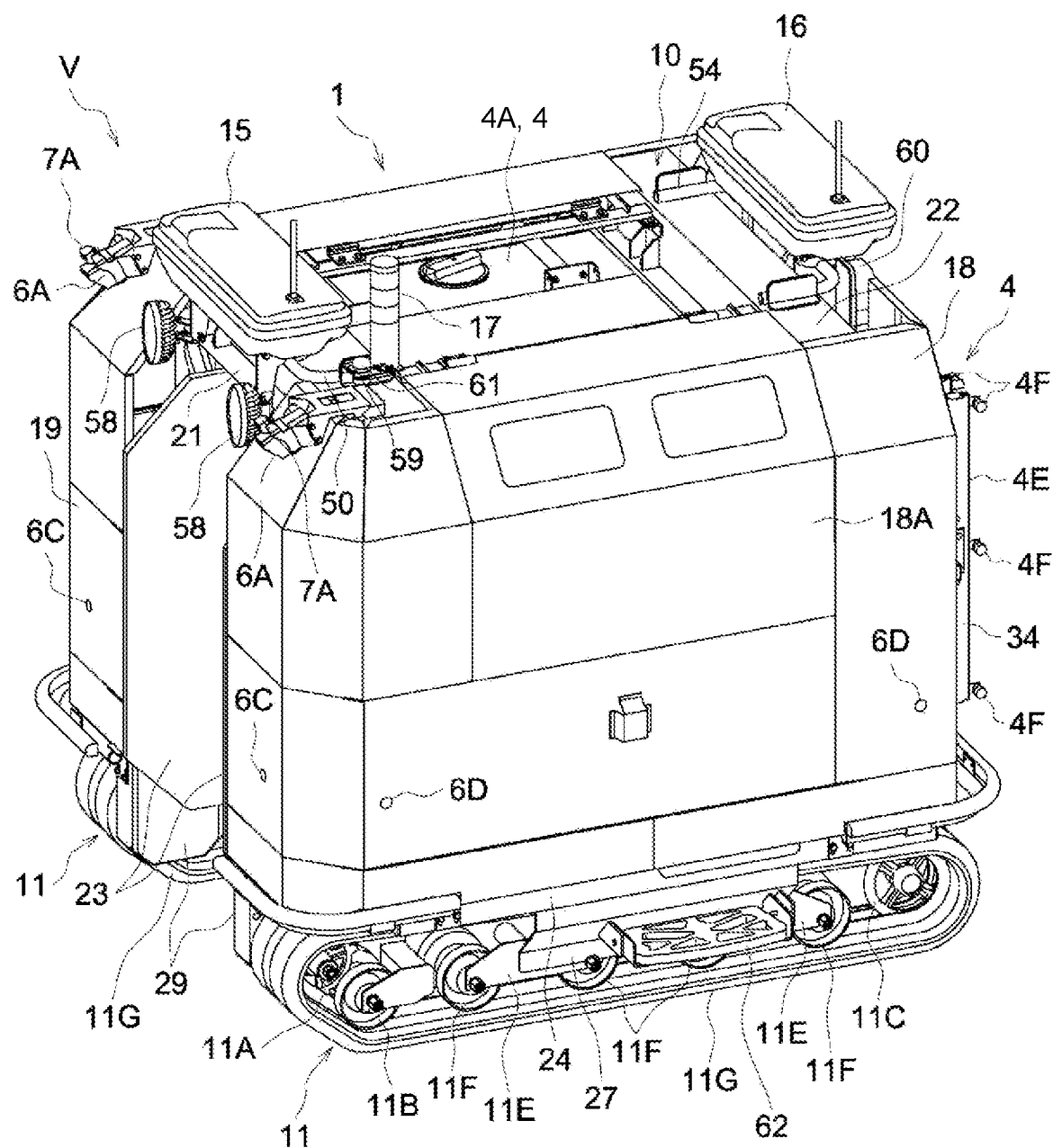
FIG. 3 is a perspective view illustrating a configuration of a farm work vehicle.

As illustrated in FIG. 3 and FIGS. 6 to 7, the left and right crawlers 11 use the base members 20A of the side frames 20 that also serve as track frames thereof. In each of the left and right crawlers 11, a driving sprocket 11A and a first rolling wheel 11B are rotatably supported at the front end of the track frame (base member) 20A. A tension play wheel 11C is supported at the rear end of the track frame 20A so as to be displaceable in the front-back direction. Front and rear equalizer arms 11E each of which pivots like a balance in an up-down direction about a corresponding one of front and rear support shafts 11D extending laterally toward outside from the track frame 20A are provided in front and rear middle portions of the track frame 20A. A second rolling wheel 11F is rotatably supported at front and rear free ends of each of the equalizer arms 11E. That is, four second rolling wheels 11F are supported at the front and rear middle portions of the track frame 20A so as to be pivotally displaceable in the up-down direction. A crawler belt 11G is put around the driving sprocket 11A, each of the rolling wheels 11B and 11F, and the play wheel 11C. A tensioning mechanism (not illustrated) is provided at a rear portion of the truck frame 20A to maintain the crawler belt 11G under tension by displacing and energizing the play wheels 11C rearwardly.

As illustrated in FIGS. 3 to 6, in the left side crawler 11, the front and rear support shafts 11D have their left ends connected to a left end of the loading stand 24 via a left side support plate 27. As illustrated in FIGS. 4 to 5 and FIG. 7, in the right side crawler 11, the front and rear support shafts 11D have their right ends connected to a right end of the oil tank 14 via a right side support plate 27. That is, in the work vehicle V, the vehicle body frame 10 and the left and right crawlers 11 are configured as a single structure.

As illustrated in FIG. 4 and FIGS. 6 to 7, power from the engine 12 is transmitted to the respective driving sprockets 11A of the crawlers 11 via a pair of hydrostatic continuously variable transmissions (hereinafter referred to as HSTs) 30 and left and right chain-type transmission devices 31. As each of the HSTs 30, a separate-type HST having a variable displacement, axial plunger type hydraulic pump 30A, a fixed displacement, axial plunger type hydraulic motor 30B, and a plurality of hydraulic pipes 30C connecting the hydraulic pump 30A and the hydraulic motor 30B is employed.

With the above-described configuration, the left and right crawlers 11 are driven by power from the engine 12 in a state where independent shifting by the corresponding HST 30 is possible. Thus, the vehicle body 1 is put in a forward state where the vehicle body 1 moves forward by driving the left and right crawlers 11 at equal speeds in a forward direction and is put in a backward state where the vehicle body 1 moves rearward by driving the left and right crawlers 11 at equal speeds in the backward direction. The vehicle body 1 is put in a forward turning state where the vehicle body 1 turns slowly while moving forward by driving the left and right crawlers 11 at unequal speeds in the forward direction and is put in a backward turning state where the vehicle body 1 turns slowly while moving backward by driving the left and right crawlers 11 at unequal speeds in the backward direction. The vehicle body 1 is put in a pivot turning state by driving, while driving of one of the left and right crawlers 11 is stopped, the other one of the left and right crawlers 11, and is put in a spin turning state by driving the left and right crawlers 11 at equal speeds in the forward and backward directions. The vehicle body 1 is put in a travel stop state by stopping driving of the left and right crawlers 11.

The left and right crawlers 11 may electrically configured such that their driving sprockets 11A are driven by left and right electric motors.

As illustrated in FIG. 6, in each of the HSTs 30, their hydraulic pumps 30A are of a dual-type that is driven by a single pump shaft (not illustrated) directly connected to an output shaft 12A of the engine 12. The dual hydraulic pump 30A is placed on the loading stand 24 in an arrangement directly below the fuel tank 26. As illustrated in FIGS. 3 to 4 and FIGS. 6 to 7, each of the left and right hydraulic motors 30B is attached to an upper portion of a transmission case 29 connected to a lower portion of the front end of each of the side frames 20. Each of the hydraulic pipes 30C is provided along the vehicle body frame 10. Each of the left and right chain-type transmission devices 31 transmits power to a drive shaft (not illustrated) that turns integrally with the driving sprocket 11A of the crawler 11 from the output shaft (not illustrated) of the hydraulic motor 30B in a corresponding one of the transmission cases 29.

As illustrated in FIG. 3 and FIGS. 5 to 8, the chemical spraying device 4 includes a chemical tank 4A that stores chemical liquid, a chemical pump 4B that pumps the chemical liquid, an electric spraying motor 4C that drives the chemical pump 4B, a belt-type transmission device 4D that transmits power from the spraying motor 4C to the chemical pump 4B, spraying pipes 4E provided such that two spraying pipes 4E are arranged at each of left and right sides in a longitudinal attitude in a back portion of the vehicle body 1, twelve spraying nozzles 4F in total provided such that three spraying nozzles 4F are arranged in each spraying pipe 4E, an electronically controlled valve unit 4G that changes amount and pattern of spraying of the chemical liquid, a plurality of chemical pipes (not illustrated) that connect these components, and the like.

The chemical tank 4A is supported by the oil tank 14 via front and rear support frames 32 and 33 provided on a top surface of the oil tank 14. The chemical pump 4B is placed on a rear portion of the loading stand 24. The spraying motor 4C is supported by a second support portion 24B provided to the rear portion of the loading stand 24. The spraying motor 4C is arranged directly above the chemical pump 4B. Each of the two spraying pipes 4E on a left side is attached to a support member 20E having an L shape in a plan view and provided to the left side frame 20 via a pipe holder 34 extending in the up-down direction and a bracket 35 connected to upper and lower middle portions of the pipe holder 34. Each of the two spraying pipes 4E on a right side is attached to a support member 20E having an L shape in a plan view and provided on the right side frame 20 via a pipe holder 34 extending in the up-down direction and a bracket 35 connected to upper and lower middle portions of the pipe holder 34.

Each of the spraying nozzles 4F is attached to a corresponding one of the spraying pipes 4E so as to be repositionable in the up-down direction. Thus, spaces between the spraying nozzles 4F in the up-down direction and height positions of the spraying nozzles 4F relative to the spraying pipes 4E can be changed in accordance with a spray target. Each of the pipe holders 34 is pin-connected to a corresponding one of the brackets 35 in the up-down direction so as to be repositionable. Thus, the height position of each of the spraying nozzles 4F relative to the vehicle body 1 can be changed for each of the pipe holders 34 in accordance with the spray target. Each of the brackets 35 is pin-connected to a corresponding one of the support members 20E so as to be repositionable in the left-right direction. Thus, a position of each of the spraying nozzles 4F in the left-right direction relative to the vehicle body 1 can be changed for each of the brackets 35 in accordance with the spray target.

As illustrated in FIG. 3 and FIGS. 5 to 9, among the spraying nozzles 4F, six middle spraying nozzles 4F provided to two of the spraying pipes 4E at center of the vehicle body 1 spray the chemical liquid to trees Z located in a space at center of the vehicle body in the left-right direction. Three left spraying nozzles 4F provided to the spraying pipe 4E at a left end of the vehicle body spray the chemical liquid to trees Z located at a left outer side of the vehicle body 1. Three right spraying nozzles 4F provided to the spraying pipe 4E at a right end of the vehicle body spray the chemical liquid to trees Z located at a right outer side of the vehicle body 1.

As illustrated in FIG. 7, a left end of the oil tank 14 is supported by the base member 20A of the right side frame 20. A support plate 36 is connected to a right end of the oil tank 14. An upper end of the support plate 36 is connected to an upper member 20D of the right side frame 20 via front and rear support members 37. Thus, a right end of the oil tank 14 is supported by the upper member 20D of the right side frame 20 via the support plate 36 and the front and rear support members 37.

That is, the oil tank 14 has a high support strength that enables it to be used as a loading stand on which the chemical tank 4A is placed, as both its left and right ends are supported by the right side frame 20. A shape of the oil tank 14 in a plan view is laterally symmetrical to a shape of the loading stand 24 in a plan view.

As illustrated in FIG. 2, an automatic travel control unit 40 that causes the vehicle body 1 to automatically travel in accordance with a target path P (see FIG. 9) in a farm, based on positioning information from the positioning unit 5 or the like, an engine control unit 41 that controls the engine 12, an HST control unit 42 that controls each of the HSTs 30, a work device control unit 43 that controls a work device, and the like are mounted on the vehicle body 1. Each of the control units 40 to 43 is constructed by an electronic control unit on which a microcontroller and the like are mounted and various information and control programs stored in a non-volatile memory (for example, EEPROM, such as flash memory or the like) of the microcontroller. The various information stored in the non-volatile memory includes the target path P generated in advance in accordance with the farm that is a work target, or the like.

The control units 40 to 43 are connected to each other so as to mutually communicate with each other via a controller area network (CAN) that is an example of an in-vehicle network. For example, in-vehicle Ethernet, CAN with Flexible Data Rate (CAN-FD), or the like may be used for the in-vehicle network.

Figure 9:
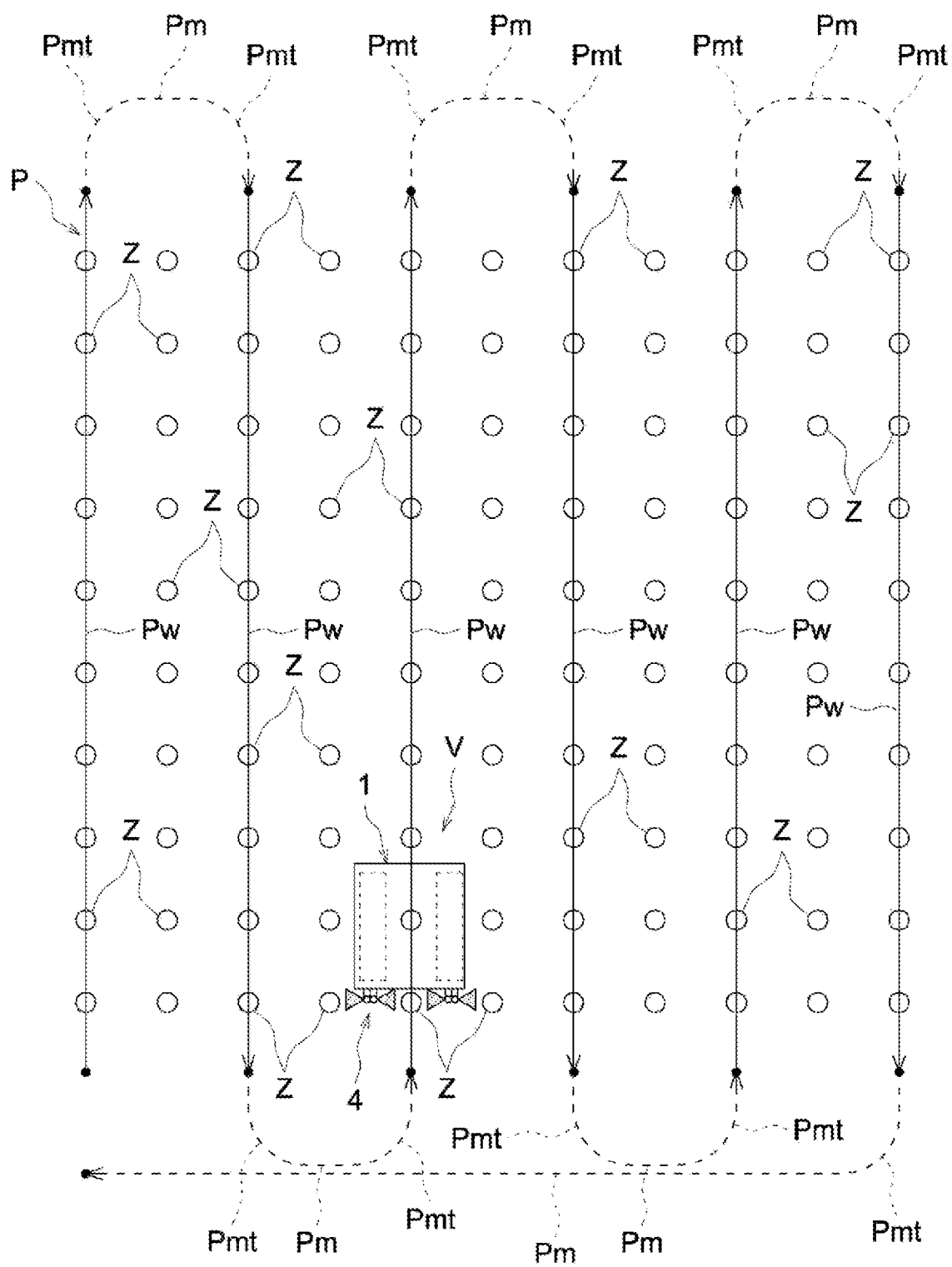
FIG. 9 is a plan view illustrating a target path for the work vehicle in a farm.

As illustrated in FIG. 9, the target path P includes work paths Pw in a plurality of lines along which the work vehicle V travels while performing work on the trees Z planted in a plurality of lines and a plurality of moving paths Pm connecting the work paths Pw in the plurality of lines in a travel order of the work vehicle V. Each of the moving paths Pm is a path along which the work vehicle V travels without performing any work. Each of the moving paths Pm includes a turning path Pmt used for changing the direction of the vehicle body 1. The target path P includes various information related to automatic travel, such as the travel direction, set vehicle speed, a travel state, a work state, or the like, of the vehicle body 1 in each of the paths Pw and Pm.

Incidentally, in each of the work paths Pw, the vehicle speed is set to relatively high speed (work speed) because each of the work paths Pw is a straight path or an approximately straight path corresponding to trees Z planted in a plurality of lines. In each of the turning paths Pmt of each of the moving paths Pm, the vehicle speed is set to lower speed (turning speed) than the vehicle speed in the work paths Pw in order to prevent the work vehicle V from deviating from the turning path Pmt. On the other hand, in the other moving paths than the turning paths Pmt, the vehicle speed is set to the same relatively high speed as that on the work paths Pw because they are straight paths or approximately straight paths similar to the work paths Pw.

The target path P illustrated in FIG. 9 is merely one example. The target path P can be changed in various manners in accordance with vehicle information, such as a type of the work device provided in the vehicle body 1, a type of work, or the like, and work site information, such as an arrangement state and the number of lines of the trees Z that vary from farm to farm.

As illustrated in FIG. 2, the mobile communication terminal 3 includes a terminal control unit 3B that performs control related to a display device 3A or the like. The terminal control unit 3B is constructed by an electronic control unit on which a microcontroller and the like are mounted and various information and control programs stored in a non-volatile memory (for example, EEPROM, such as flash memory or the like) of the microcontroller. The various information stored in the non-volatile memory includes work site information, the target path P (see FIG. 9), or the like. Thus, the work site information, the target path P, or the like can be displayed on the display device 3A of the mobile communication terminal 3.

The vehicle body 1 and the mobile communication terminal 3 include communication modules 28 and 3C that enable wireless communication between the automatic travel control unit 40 and the terminal control unit 3B, respectively. The communication module 28 of the vehicle body 1 functions as a converter that converts communication information into CAN and Wi-Fi bidirectionally in a case where Wi-Fi is employed for wireless communication with the mobile communication terminal 3. The terminal control unit 3B can acquire various information related to the vehicle body 1, including the current position and current orientation of the vehicle body 1, through wireless communication with the automatic travel control unit 40. Thus, various information including the current position and current orientation of the vehicle body 1 relative to the target path P can be displayed on the display device 3A of the mobile communication terminal 3.

Figure 8:
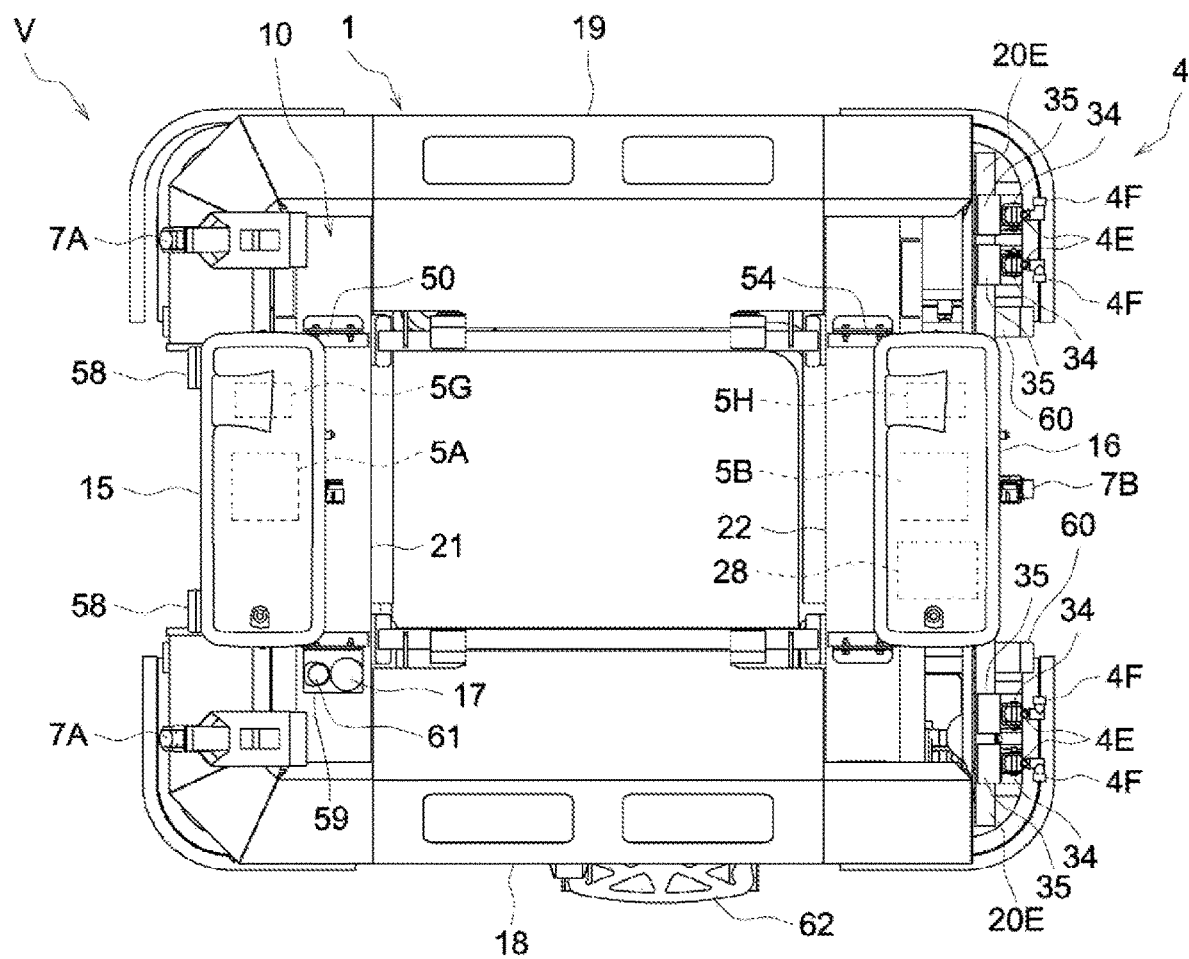
FIG. 8 is a plan view illustrating the configuration of the farm work vehicle.

As illustrated in FIG. 2 and FIG. 8, the positioning unit 5 includes two GNSS antennas (examples of positioning antennas) 5A and 5B that receive radio waves transmitted from a plurality of positioning satellites 8 (see FIG. 1), two GNSS receivers (examples of positioning sections) 5C and 5D that use the radio waves received by the GNSS antenna 5A and 5B to measure respective positions of the GNSS antennas 5A and 5B (which will be hereinafter occasionally referred to simply as the antenna positions), an inertial measurement unit (IMU) 5E that measures attitude and orientation of the vehicle body 1, a positioning module (an example of a calculation unit) 5F that calculates the current position and current orientation of the vehicle body 1, based on position information from each of the GNSS receivers 5C and 5D and measurement information from the inertial measurement device 5E, and the like.

Each of the GNSS receivers 5C and 5D and the inertial measurement device 5E is connected to the automatic travel control unit 40 via CAN so as to mutually communicate with the automatic travel control unit 40. The inertial measurement device 5E includes a 3-axis gyroscope and a 3-directional acceleration sensor, and the like. The positioning module 5F is constructed by a control program for positioning or the like stored in a non-volatile memory of the automatic travel control unit 40.

GNSS-based positioning methods include differential GNSS (DGNSS): relative positioning system, real time kinematic GNSS (RTK-GNSS): interferometric positioning system, and the like. In this embodiment, highly accurate RTK-GNSS suitable for positioning of mobile objects is used. Therefore, base stations 9 that enable positioning by RTK-GNSS are installed at known locations around the farm.

As illustrated in FIGS. 1 to 2, the base station 9 is provided with a GNSS antenna 9A that receives radio waves transmitted from the plurality of positioning satellites 8 and a GNSS receiver 9B that uses the radio waves received by the GNSS antenna 9A to measure a position of the GNSS antenna 9A (which will be hereinafter occasionally referred to simply as the antenna position). The GNSS receiver 9B acquires position correction information, based on the measured antenna position and an installation position of the base station 9. The positioning unit 5 and the base station 9 are provided with communication modules 5G, 5H, and 9C that enable wireless communication between the GNSS receivers 5C and 5D of the positioning unit 5 and the GNSS receiver 9B of the base station 9. This allows each of the GNSS receivers 5C and 5D of the positioning unit 5 to receive the position correction information from the GNSS receiver 9B of the base station 9.

Each of the GNSS receivers 5C and 5D of the positioning unit 5 corrects a corresponding one of the antenna positions measured by them, based on the position correction information from the GNSS receiver 9B of the base station 9. This allows each of the GNSS receivers 5C and 5D to measure the position (latitude, longitude, and altitude in the global coordinate system) of each of the GNSS antennas 5A and 5B with high accuracy. The positioning unit 5 has the GNSS receivers 5C and 5D and the inertial measurement device 5E, so that reduction in positioning accuracy in the GNSS receivers 5C and 5D caused by deterioration of a surrounding environment or the like can be supplemented by the inertial measurement device 5E. The positioning unit 5 can correct measurement errors accumulated in the inertial measurement device 5E, based on the antenna positions measured by the GNSS receivers 5C and 5D. Even with the GNSS antennas 5A and 5B arranged at a top of the vehicle body 1 in order to increase a reception sensitivity of each of the GNSS antennas 5A and 5B, the positioning unit 5 can correct misalignment of each antenna position in the left-right direction of the vehicle body relative to the target path P caused by the rolling of the vehicle body 1, based on an installation height of each of the GNSS antennas 5A and 5B and a roll angle of the vehicle body 1 measured by the inertial measurement device 5E. This allows the positioning unit 5 to measure the current position, current orientation, and attitude angles (yaw angle, roll angle, and pitch angle) of the vehicle body 1 with high accuracy.

As illustrated in FIG. 8, each of the GNSS antennas 5A and 5B of the positioning unit 5 is separately installed in two positions, that is, front and rear positions, in the ceiling of the vehicle body 1 at predetermined intervals in the front-rear direction of the vehicle body. Respective height positions of the front and rear GNSS antennas 5A and 5B are set at the same height. Of the front and rear GNSS antennas 5A and 5B, the front GNSS antenna 5A is provided in the front antenna unit 15 together with the communication module 5G connected to the GNSS receiver 5C corresponding to the front GNSS antenna 5A, or the like. The rear GNSS antenna 5B is provided in a rear antenna unit 16 together with the communication module 5H connected to the GNSS receiver 5D corresponding to the rear GNSS antenna 5B, the inertial measurement device 5E, the communication module 28 for the mobile communication terminal 3, or the like. The positional relationship between the antennas, the installation height, and the like of the front and rear GNSS antennas 5A and 5B are stored in the non-volatile memory of the automatic travel control unit 40.

Figure 10:
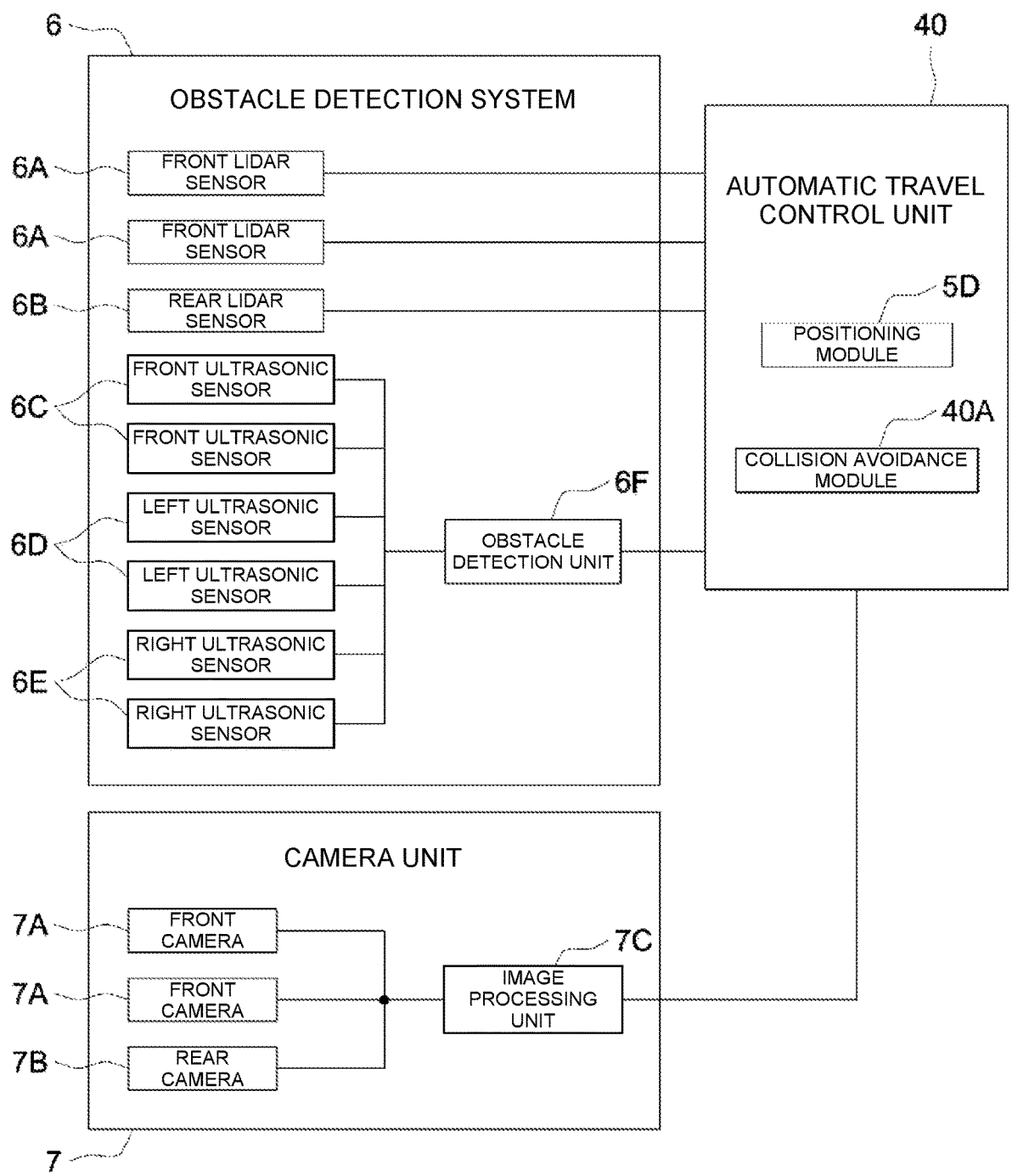

As illustrated in FIG. 10, the obstacle detection system 6 includes left and right front LiDAR sensors 6A and a single rear LiDAR sensor 6B. As illustrated in FIGS. 3 to 4 and FIG. 6, of the left and right front LiDAR sensors 6A, the left front LiDAR sensor 6A is arranged in a left front end in the ceiling of the vehicle body 1 in a front down attitude looking down on a left front side of the vehicle body 1 from an obliquely upper side. Thus, for the left front LiDAR sensor 6A, a predetermined range at the left front side of the vehicle body is set as a measurement range. As illustrated in FIGS. 3 to 4 and FIG. 7, the right front LiDAR sensor 6A is arranged at a right front end in the ceiling of the vehicle body 1 in a front down attitude looking down on a right front side of the vehicle body 1 from an obliquely upper side. Thus, for the right front LiDAR sensor 6A, a predetermined range at the right front side of the vehicle body is set as a measurement range. As illustrated in FIGS. 5 to 7, the rear LiDAR sensor 6B is arranged at a rear end of the ceiling of the vehicle body 1 at center in the left-right direction in a rear down attitude looking down on a rear side of the vehicle body 1 from an obliquely upper side. Thus, for the rear LiDAR sensor 6B, a predetermined range at the rear side of the vehicle body is set as a measurement range.

Each of the LiDAR sensors 6A and 6B measures a distance from a corresponding one of the LiDAR sensors 6A and 6B to each distance measurement point (measurement target object) in the measurement ranges by a time-of-flight (TOF) method used for measuring the distance to a distance measurement point, based on a round trip time until an irradiated laser beam reaches the distance measurement point and returns. Each of the LiDAR sensors 6A and 6B scans the laser beam horizontally and vertically at high speed over the entire measurement ranges and sequentially measures the distance to the distance measurement point at each scanning angle (coordinates). Each of the LiDAR sensors 6A and 6B generates a distance image from measurement information, such as the measured distance to each distance measurement point, the scanning angle (coordinates) for each distance measurement point, or the like, and extracts a group of distance measurement points that are presumed to be obstacles, and then, transmits the measurement information related to the extracted group of distance measurement points to the automatic travel control unit 40 as measurement information related to obstacles.

As illustrated in FIG. 10, the obstacle detection system 6 includes left and right front ultrasonic sensors 6C, front and rear left ultrasonic sensors 6D, front and rear right ultrasonic sensors 6E, and a single obstacle detection unit 6F. As illustrated in FIGS. 3 to 4 and FIGS. 6 to 7, the left and right front ultrasonic sensors 6C are arranged at left and right front ends of the vehicle body 1 in a forward facing attitude. Thus, for the left and right front ultrasonic sensors 6C, left and right predetermined ranges at a front side of the vehicle body are set as measurement ranges. As illustrated in FIG. 3, the front and rear left ultrasonic sensors 6D are arranged at front and rear left ends of the vehicle body 1 in a left facing attitude. Thus, for the front and rear left ultrasonic sensors 6D, front and rear predetermined ranges at the left outer side of the vehicle body 1 are set as measurement ranges. The front and rear right ultrasonic sensors 6E are arranged at front and rear right ends in the vehicle body 1 in a right facing attitude. Thus, for the front and rear right ultrasonic sensors 6E, front and rear predetermined ranges at a right outer side of the vehicle body 1 are set as measure ranges.

The obstacle detection unit 6F determines whether a measurement target object in the measurement range of each of the ultrasonic sensors 6C to 6E, based on transmission and reception of ultrasonic waves at each of the ultrasonic sensors 6C to 6E. The obstacle detection unit 6F measures a distance from each of the ultrasonic sensors 6C to 6E to the measurement target object by the time-of-flight (TOF) method used for measuring a distance to a distance measurement point, based on a round trip time until transmitted ultrasonic waves reach the distance measurement point and return. The obstacle detection unit 6F transmits the measured distance to the measured measurement target object and the direction of the measurement target object to the automatic travel control unit 40 as measurement information related to the obstacle.

Each of the LiDAR sensors 6A and 6B and the obstacle detection unit 6F includes an electronic control unit on which a microcontroller and the like are mounted, various control programs, and the like. Each of the LiDAR sensors 6A and 6B and the obstacle detection unit 6F is connected to the automatic travel control unit 40 via CAN so as to mutually communicate with the automatic travel control unit 40.

As illustrated in FIG. 2 and FIG. 10, the automatic travel control unit 40 includes a collision avoidance module 40A that avoids a risk that the work vehicle V collides with an obstacle, based on measurement information related to the obstacle from each of the LiDAR sensors 6A and 6B and the obstacle detection unit 6F.

As illustrated in FIG. 10, the camera unit 7 includes left and right front cameras 7A that photograph a front side of the vehicle body 1, a single rear camera 7B that photographs the rear side of the vehicle body 1, and an image processing unit 7C that processes images from each of the cameras 7A and 7B. As illustrated in FIGS. 3 to 4, FIG. 6, and FIG. 8, of the left and right front cameras 7A, the left front camera 7A is arranged at the left front end in the ceiling of the vehicle body 1 in a front down attitude looking down on the left front side of the vehicle body 1 from an obliquely upper side. Thus, for the left front camera 7A, a predetermined range at the left front side of the vehicle body is set as an imaging range. As illustrated in FIGS. 3 to 4 and FIGS. 7 to 8, the right front camera 7A is arranged at the right front end in the ceiling of the vehicle body 1 in a front down attitude looking down on the right front side of the vehicle body 1 from an obliquely upper side. Thus, for the right front camera 7A, a predetermined range at the right front side of the vehicle body is set as an imaging range. As illustrated in FIGS. 5 to 8, the rear camera 7B is arranged at the rear end of the ceiling of the vehicle body 1 at center in the left-right direction in a rear down attitude looking down on a rear side of the vehicle body 1 from an obliquely upper side. As a result, for the rear camera 7B, a predetermined range at the rear side of the vehicle body is set as an imaging range.

The image processing unit 7C includes an electronic control unit on which a microcontroller and the like are mounted, various control programs, and the like. The image processing unit 7C is connected to the automatic travel control unit 40 via CAN so as to mutually communicate with the automatic travel control unit 40. The image processing unit 7C processes the information from each of the cameras 7A and 7B to generate a left front image of the vehicle body, a right front image of the vehicle body, and a rear image of the vehicle body, or the like and transmits the image to the automatic travel control unit 40. The automatic travel control unit 40 transfers each transmitted image to the terminal control unit 3B of the mobile communication terminal 3. Thus, the left front image of the vehicle body, the right front image of the vehicle body, the rear image of the vehicle body, or the like can be displayed on the display device 3A of the mobile communication terminal 3. A user can then easily grasp a situation on the front side of the vehicle body and a situation on the rear side of the vehicle body by viewing each image displayed on the display device 3A.

The camera unit 7 may be included in the obstacle detection system 6 by applying a learning process for recognizing trees or the like in the farm as obstacles to the camera unit 7. In this case, the obstacle can be detected with higher accuracy, based on information related to the obstacle from each of the LiDAR sensors 6A and 6B and each of the ultrasonic sensors 6C to 6E with high distance measurement accuracy and information related to the obstacle from the camera unit 7 with high object discrimination accuracy.

In the work vehicle V, in a case where start of automatic travel is commanded by a user's touch operation on the display device 3A of the mobile communication terminal 3, the positioning module 5F of the positioning unit 5 executes positioning control to measure the current position and current orientation of the vehicle body 1. Also, the automatic travel control unit 40 executes automatic travel control to cause the vehicle body 1 to automatically travel in accordance with the target path P, based on the target path P in the farm stored in the non-volatile memory, positioning information from the positioning module 5F, or the like.

The automatic travel control includes engine command processing in which control commands related to the engine 12 are transmitted to the engine control unit 41, HST command processing in which control commands related to the HSTs 30 are transmitted to the HST control unit 42, work command processing in which control commands related to the work device, such as the chemical spraying device 4 or the like, are transmitted to the work device control unit 43, and the like.

In the engine command processing, the automatic travel control unit 40 transmits, to the engine control unit 46A, an engine speed change command to instruct changing of engine speed, based on set engine speed included in the target path P, or the like. The engine control unit 46A executes engine speed control that changes the engine speed in response to the engine speed change command transmitted from the automatic travel control unit 46F, or the like.

In the HST command processing, the automatic travel control unit 40 transmits, to the HST control unit 42, a travel state switching command to instruct switching of the travel state, based on the travel state of the vehicle body 1 included in the target path P and a vehicle speed change command to instruct changing of the vehicle speed, based on set vehicle speed included in the target path P, or the like. The HST control unit 42 executes travel state switching control to control an operation of each of the HSTs 30 in response to a travel state switching command transmitted from the automatic travel control unit 40, vehicle speed control to control the operation of each of the HSTs 30 in response to the vehicle speed change command transmitted from the automatic travel control unit 40, or the like.

In the work command processing, the automatic travel control unit 40 transmits, to the work device control unit 43, a spray pattern switching command to instruct switching of a spray pattern in the chemical spraying device 4, based on a spray pattern included in the target path P, a spray start command to instruct start of spraying chemical liquid by the chemical spraying device 4, based on a work start point included in the target path P, a spray stop command to instruct stop of spraying the chemical liquid by the chemical spraying device 4, based on a work stop point included in the target path P, or the like. The work device control unit 43 executes chemical spraying control that controls a spraying state of the chemical liquid by the chemical spraying device 4 by controlling an operation of the valve unit 4G in accordance with the spray pattern switching command, the spray start command, the spray stop command, or the like transmitted from the automatic travel control unit 40.

That is, the automatic travel unit 2 described above includes the positioning unit 5, the obstacle detection system 6, the camera unit 7, the automatic travel control unit 40, the engine control unit 41, the HST control unit 42, the work device control unit 43, and the like. When these units properly operate, the work vehicle V can be accordingly caused to automatically travel in accordance with the target path P, and the chemical spraying work by the chemical spraying device 4 can be properly performed.

Although not illustrated, the vehicle body 1 includes various detection devices, such as a first rotation sensor that detects output rotation speed of the engine 12, left and right second rotation sensors that detect respective output rotation speeds of the hydraulic motors 30B in the HSTs 30, a first residual volume sensor that detects a residual volume of the chemical liquid in the chemical tank 4A, a second residual volume sensor that detects a residual volume of a fuel in the fuel tank 26, or the like.

A control operation of the positioning module 5F in positioning control will be described below based on flowcharts of FIGS. 11 to 14 and FIGS. 15 to 17.

Figure 11:
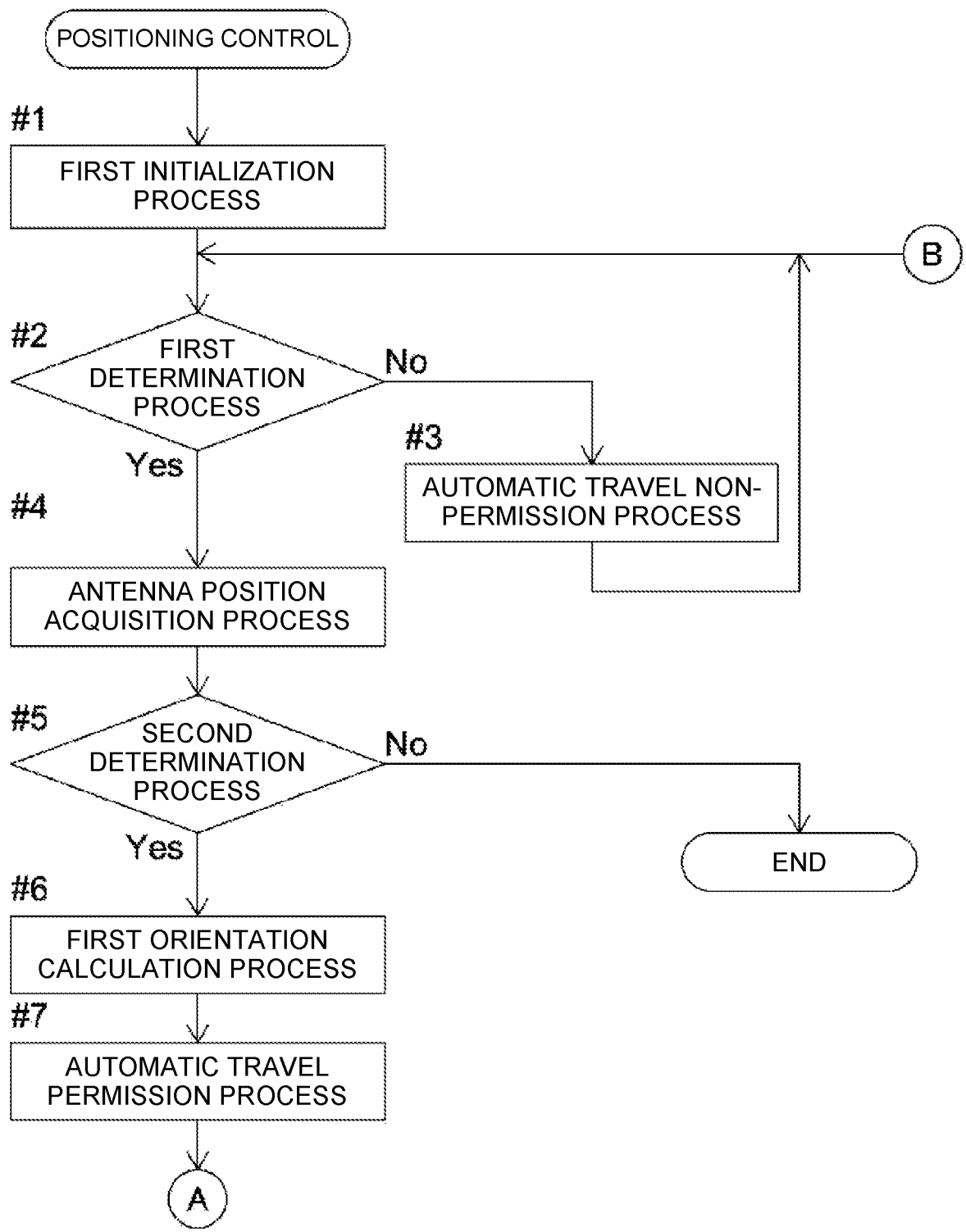
FIG. 11 is a flowchart of positioning control.

As illustrated in FIG. 11, the positioning module 5F performs a first initialization process to initialize the front and rear GNSS receivers 5C and 5D upon start of the positioning control and a first determination process to determine whether positioning states of both of the front and rear GNSS receivers 5C and 5D have converged from a low-accuracy positioning state (FLOAT state) with a positioning accuracy of several tens of centimeters to a high-accuracy positioning state (FIX state) with a positioning accuracy of several centimeters in the first initialization process (Steps #1 and #2).

While the positioning states have not converged to the high-accuracy positioning state in the first determination process, the positioning module 5F continues an automatic travel non-permission process that does not permit execution of automatic travel control (Step #3). If the positioning states have converged to the high-accuracy positioning state in the first determination process, the positioning module 5F performs an antenna position acquisition process to acquire front and rear antenna positions (latitude, longitude, and altitude of each of the GNSS antennas 5A and 5B in the global coordinate system) measured by the GNSS receivers 5C and 5D in the high-accuracy positioning state and a second determination process (synchronization determination process) to determine whether a difference between a reception time of the front antenna position and a reception time of the rear antenna position in the front and rear GNSS receivers 5C and 5D is within a first specified time (Steps #4 and #5).

If the difference between the antenna position reception times is within the first specified time in the second determination process, the positioning module 5F performs a first orientation calculation process to calculate the orientation of the vehicle body 1 from the front and rear antenna positions and an automatic travel permission process to permit execution of automatic travel control (Steps #6 and #7). If the difference between the antenna position reception times exceeds the first specified time in the second determination process, the positioning module 5F terminates the positioning control without permitting execution of the automatic travel control.

As illustrated in FIGS. 14 to 17, the first orientation calculation process includes a first coordinate transformation process to coordinate-transform front and rear antenna positions p1 and p2 measured by the GNSS receivers 5C and 5D into a NED coordinate system with one of the front and rear antenna positions (in this case, the rear antenna position p2) as the origin, an inclination calculation process to calculate an inclination θL of a straight line L connecting the antennas with an X axis (north: N) set to 0 degrees from a difference Δx in an X direction and a difference Δy in a Y direction of the front antenna position p1 relative to the rear antenna position p2 in the NED coordinate system (see FIG. 15), an inclination offset amount calculation process to calculate an inclination offset amount Δθ between the antennas in a case where the vehicle body 1 is caused to face true north (N), based on a positional relationship between the front and rear GNSS antennas 5A and 5B stored in the volatile memory of the automatic travel control unit 40 (see FIG. 16), and an orientation calculation process to calculate an orientation θv of the vehicle body 1 from a difference between the inclination θL of the straight line L obtained in the inclination calculation process and the inclination offset amount Δθ between the antennas obtained in the inclination offset amount calculation process (see FIG. 17) (Steps #31 to 34).

Figure 12:
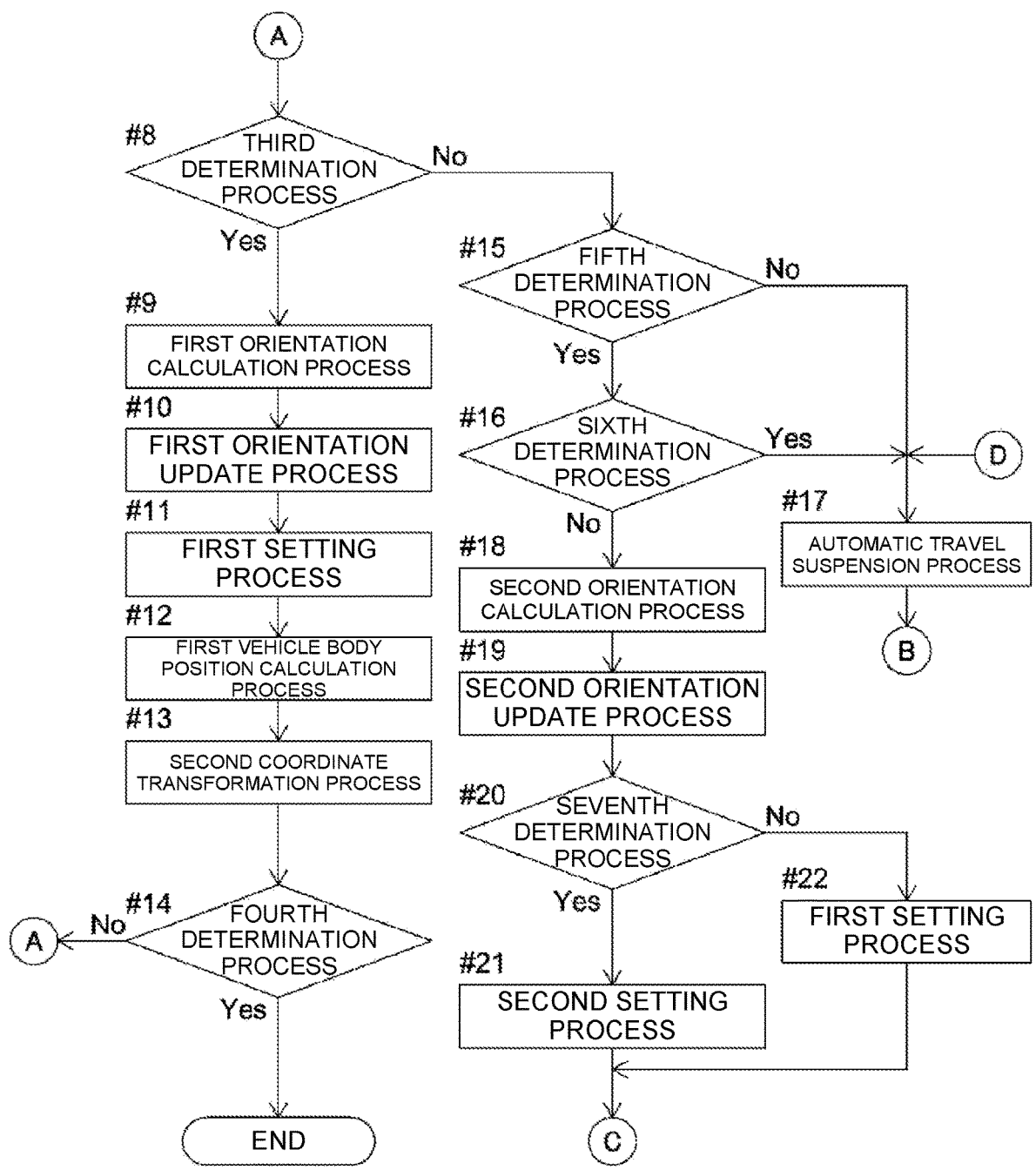
FIG. 12 is a flowchart of the positioning control.

As illustrated in FIG. 12, after performing the automatic travel permission process, the positioning module 5F performs a third determination process to determine whether the positioning states of both of the front and rear GNSS receivers 5C and 5D are high-accuracy positioning states (Step #8).

If it is determined that both of the front and rear GNSS receivers 5C and 5D are in the high-accuracy positioning state in the third determination process, the positioning module 5F performs the first orientation calculation process described above (Step #9), and performs a first orientation update process to update the orientation of the vehicle body 1 calculated in the first orientation calculation process as the current orientation of the vehicle body 1 (Step #10). The positioning module 5F also performs a first setting process to set the rear antenna position as a reference position used for calculating the current position of the vehicle body 1 in the NED coordinate system, a first vehicle body position calculation process to calculate the current position of the vehicle body 1 in the NED coordinate system, and a second coordinate transformation process to coordinate-transform the calculated current position of the vehicle body 1 from the NED coordinate system to the global coordinate system (Steps #11 to #13). Thereafter, the positioning module 5F performs a fourth determination process to determine whether termination of the automatic travel has been commanded by reaching an end position of the target path P or by a user's touch operation on the display device 3A of the mobile communication terminal 3, or the like (Step #14). Then, the positioning module 5F terminates the positioning control if termination of the automatic travel has been commanded in the fourth determination process, and shifts to the third determination process of Step #8 if not commanded.

If it is not determined that both of the front and rear GNSS receivers 5C and 5D are in the high-accuracy positioning state in the third determination process, the positioning module 5F performs a fifth determination process to determine whether the positioning state of either one of the front and rear GNSS receivers 5C and 5D is the high-accuracy positioning state (Step #15).

If it is determined that either one of the front and rear GNSS receivers 5C and 5D is in the high-accuracy positioning state in the fifth determination process, the positioning module 5F performs a sixth determination process to determine whether the current position of the vehicle body 1 is on the turning path Pmt (Step #16). If it is not determined that either one of the front and rear GNSS receivers 5C and 5D is in the high-accuracy positioning state in the fifth determination process and if the vehicle body 1 is on the turning path Pmt in the sixth determination process, the positioning module 5F performs an automatic travel suspension process to suspend the automatic travel control (Step #17), and then, shifts to the first determination processing of Step #2.

If the vehicle body 1 is not on the turning path Pmt in the sixth determination process, the positioning module 5F performs a second orientation calculation process to calculate the orientation of the vehicle body 1 from the orientation of the vehicle body 1 calculated in the first orientation calculation process immediately before either one of the front and rear GNSS receivers 5C and 5D is put in the low-accuracy positioning state and a yaw angle change amount measured by the inertial measurement device 5E (Step #18), and performs a second orientation update process to update the orientation of the vehicle body 1 calculated in the second orientation calculation process as the current orientation of the vehicle body 1 (Step #19).

After performing the second orientation update process, the positioning module 5F performs a seventh determination process to determine whether the positioning states are the high-accuracy positioning state (Step #20).

If the front GNSS receiver 5C is in the high-accuracy positioning state in the seventh determination process, the positioning module 5F performs a second setting process to set the front antenna position as a reference position used for calculating the current position of the vehicle body 1 in the NED coordinate system (Step #21). If the rear GNSS receiver 5D is in the high-accuracy positioning state in the seventh determination process, the first setting process described above is performed (Step #22).

Figure 13:
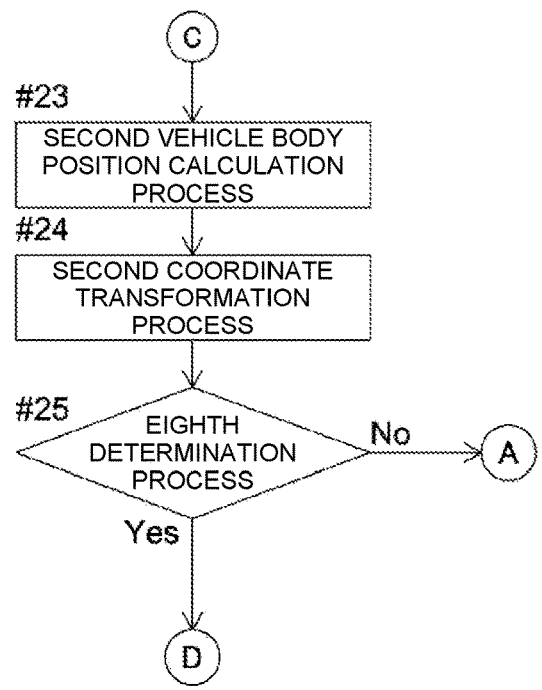
FIG. 13 is a flowchart of the positioning control.
Figure 14:
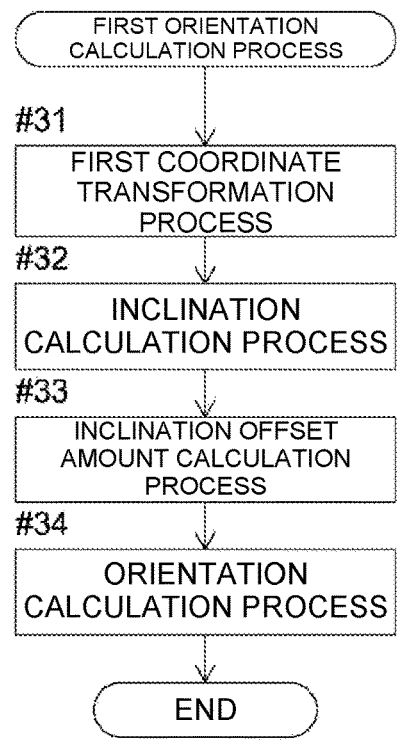
FIG. 14 is a flowchart of a first orientation calculation process.
Figure 15:
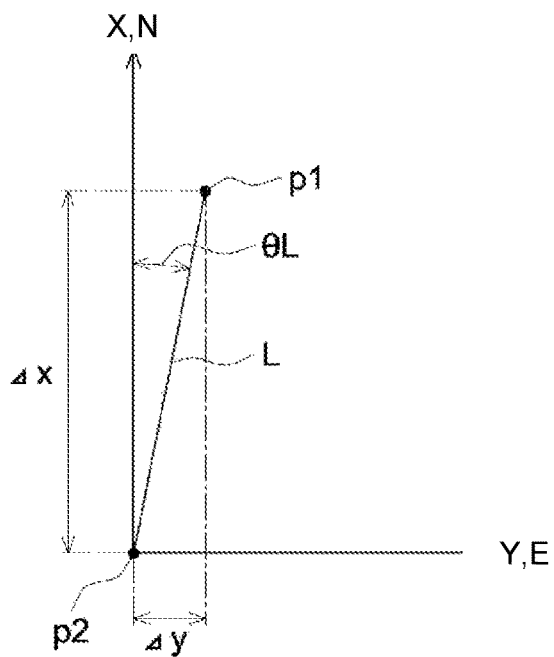
FIG. 15 is a graph illustrating an inclination calculation process.
Figure 16:
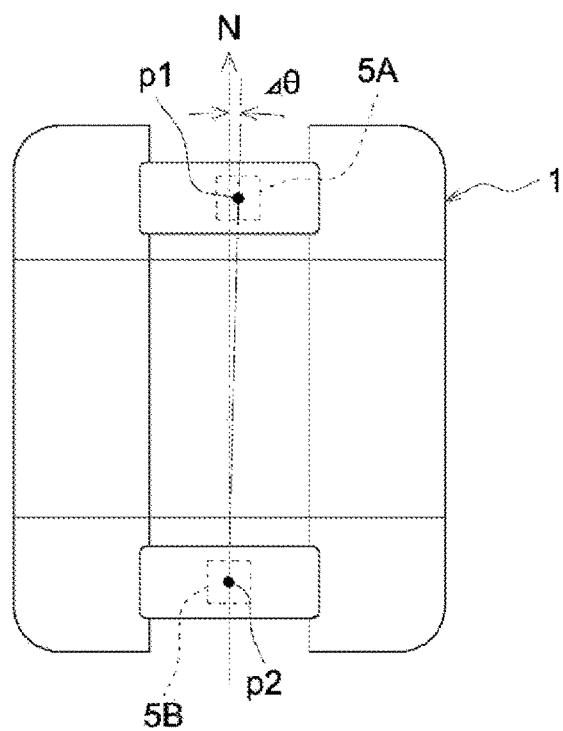
FIG. 16 a view illustrating an inclination offset amount calculation process.
Figure 17:
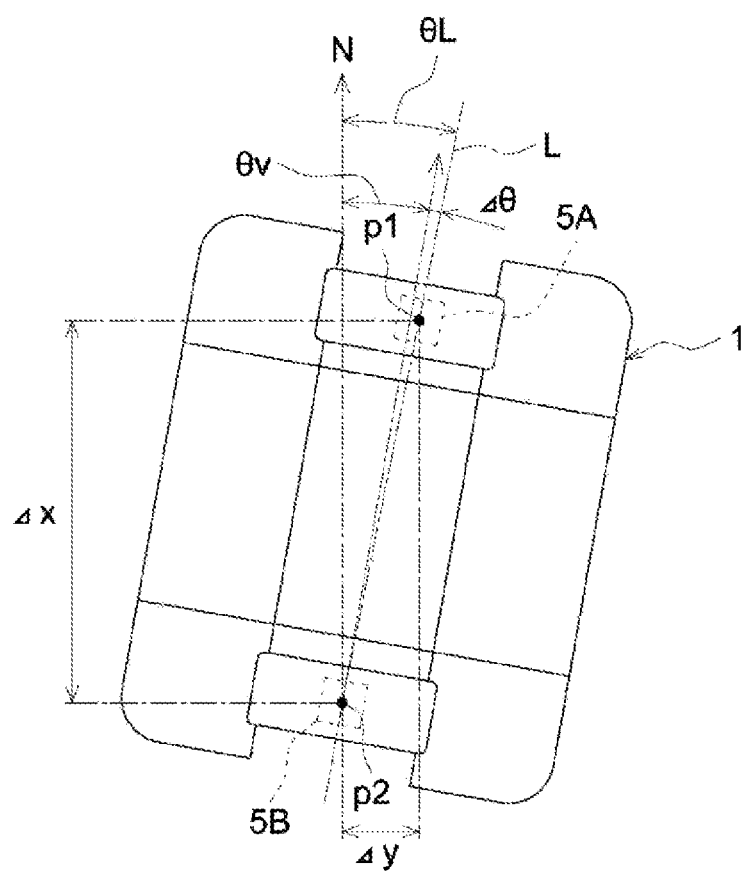
FIG. 17 is a view illustrating an orientation calculation process.

When the reference position is set in the first setting process of Step #22 or the second setting process of Step #21, as illustrated in FIG. 13, the positioning module 5F performs a second vehicle body position calculation process to calculate the current position of the vehicle body 1 in the NED coordinate system and a second coordinate transformation process to coordinate-transform the calculated current position of the vehicle body 1 from the NED coordinate system to the global coordinate system (Steps #23 to 24).

After performing the second coordinate transformation process of Step #24, the positioning module 5F performs an eighth determination process to determine whether a time since either one of the front and rear GNSS receivers 5C and 5D was put in the low-accuracy positioning state exceeds a second specified time at which measurement accuracy of the inertial measurement device 5E cannot be ensured (Step #25).

If the time exceeds the second specified time in the eighth determination process in the eighth determination process, the positioning module 5F shifts to the automatic travel suspension process of Step #17. If the positioning module 5F does not exceed the second specified time in the eighth determination process, the positioning module 5F shifts to the third determination process of Step #8.

That is, in the work vehicle V, the positioning module 5F functions as a positioning state determination unit that determines whether the positioning state of each of the GNSS receivers 5C and 5D is the high-accuracy positioning state. If the positioning module 5F determines that both of the front and rear GNSS receivers 5C and 5D are in the high-accuracy positioning state, the positioning module 5F permits start of automatic travel control. Therefore, when start of automatic travel control is permitted, the GNSS receivers 5C and 5D in the high-accuracy positioning state measures the front and rear antenna positions using GNSS, and the positioning module 5F calculates the current position and current orientation of the vehicle body 1, based on the front and rear antenna positions measured by the GNSS receivers 5C and 5D in the high-accuracy positioning state.

As described above, if the front and rear GNSS receivers 5C and 5D are in the high-accuracy positioning state, the current orientation of the vehicle body 1 can be calculated by the positioning module 5F without using the inertial measurement device 5E or an orientation sensor. Therefore, even in a case where a work site of the work vehicle V is a farm, such as an orchard or the like, where there are structures, such as metal poles, wires, or the like, or in a case where the work vehicle V turns at low speed, the current position and current orientation of the vehicle body 1 can be calculated with high accuracy.

In addition, in the work vehicle V, the positioning module 5F calculates the current orientation of the vehicle body 1, based on the front and rear antenna positions, and therefore, it is no longer necessary to obtain a movement vector of the vehicle body 1 in the process as is the case where the current orientation of the vehicle body 1 is calculated from a single antenna position. Therefore, the current orientation of the vehicle body 1 can be calculated with high accuracy even when the vehicle body 1 is turning with a small turning radius and thus it is difficult to determine a movement vector of the vehicle body 1, or when the vehicle body 1 is stopped and thus it is impossible to determine the movement vector of the vehicle body 1.

In the work vehicle V, the automatic travel control unit 40 cannot start automatic travel control until the front and rear GNSS receivers 5C and 5D are in the high-accuracy positioning state, and the automatic travel control can be started when the front and rear GNSS receivers 5C and 5D are in the high-accuracy positioning state. Therefore, at start of the automatic travel control, it is possible to cause the work vehicle V to automatically travel in accordance with the target path P, based on the highly accurate current position and current orientation of the vehicle body 1 calculated by the positioning module 5F.

In the work vehicle V, even in a case where the positioning accuracy of either one of the front and rear GNSS receivers 5C and 5D is reduced due to, for example, reduction in the number of positioning satellites 8 radio waves of which can be received by the GNSS antennas 5A and 5B or reduction in strength of the radio waves from the positioning satellites 8 caused by deterioration of the surrounding environment, the positioning module 5F can calculate the current position of the vehicle body 1 with high accuracy, based on positioning information from the GNSS receivers 5C and 5D in the high-accuracy state as long as the positioning accuracy of the other one of the GNSS receivers 5C and 5D is in the high-accuracy state. Furthermore, the positioning unit 5 includes the inertial measurement device 5E, and thus, the positioning module 5F can calculate the highly accurate current orientation of the vehicle body 1 from the highly accurate orientation (absolute orientation) of the vehicle body 1 calculated, based on the positioning information from the front and rear GNSS receivers 5C and 5D in the high-accuracy positioning state until immediately before the positioning accuracy of one of the GNSS receivers 5C and 5D is reduced and the orientation (yaw angle change) of the vehicle body 1 measured by the inertial measurement device 5E.

However, it is difficult to maintain measurement accuracy of the inertial measurement device 5E at low speed. Considering this point, in a case where the positioning accuracy of either one of the front and rear GNSS receivers 5C and 5D is reduced, the positioning module 5F determines the current position of the vehicle body 1, and if the position of the vehicle body 1 is on the work path Pw with high set speed or on some other path than the turning path Pmt in the moving path Pm, the positioning module 5F permits continuation of the automatic travel control. If the current position of the vehicle body 1 is on the turning path Pmt with low set speed, the positioning module 5F suspends the automatic travel control.

That is, even in a case where the positioning accuracy of either one of the front and rear GNSS receivers 5C and 5D is reduced, if the current position of the vehicle body 1 is on the work path Pw or on some other path than the turning path Pmt in the moving path Pm, the measurement accuracy of the inertial measurement device 5E is high, and therefore, the automatic travel control by the automatic travel control unit 40 is continued. As a result, the automatic travel control unit 40 can cause the work vehicle V to automatically travel in accordance with the target path P, based on the highly accurate current orientation of the vehicle body 1 calculated by the positioning module 5F, or the like.

In contrast, if the current position of the vehicle body 1 is on the turning path Pmt, the measurement accuracy of the inertial measurement device 5E is reduced, and therefore, the automatic travel control by the automatic travel control unit 40 is suspended. In addition, the inertial measurement device 5E is configured such that, as a measurement time increases, accumulated errors are increased. Therefore, even when the current position of the vehicle body 1 is on the work path Pw or on some other path than the turning path Pmt in the moving path Pm, the positioning module 5F suspends the automatic travel control if a time since either one of the front and rear GNSS receivers 5C and 5D was put in the low-accuracy positioning state exceeds the above-described second specified time. As a result, it is possible to avoid a risk that the work vehicle V deviates from the target path P due to automatic travel of the work vehicle V caused by the automatic travel control unit 40 based on the current orientation of the vehicle body 1 calculated by the positioning module 5F with low accuracy when the measurement accuracy of the inertial measurement device 5E is low.

Furthermore, in the work vehicle V, in a case where it is not both of the front and rear GNSS receivers 5C and 5D that are in the high-accuracy positioning state, the positioning module 5F suspends the automatic travel control. Thus, it is possible to avoid a risk that the work vehicle V deviates from the target path P due to automatic travel of the work vehicle V caused by the automatic travel control unit 40, based on the current orientation of the vehicle body 1 calculated by the positioning module 5F with low accuracy when both of the front and rear GNSS receivers 5C and 5D are not in the high-accuracy positioning state.

In addition, in the work vehicle V, when the positioning accuracy of either one of the front and rear GNSS receivers 5C and 5D is reduced, the positioning module 5F calculates the current position of the vehicle body 1, based on, as a reference, the antenna positions measured by the GNSS receivers 5C and 5D in the high-accuracy positioning state, and therefore, the module 5F can calculate the current position of the vehicle body 1 with high accuracy even when the positioning accuracy of either one of the GNSS receivers 5C and 5D is reduced. As a result, the automatic travel control unit 40 can cause the work vehicle V to automatically travel in accordance with the target path P, based on the highly accurate current position of the vehicle body 1 calculated by the positioning module 5F or the like.

The current position of the vehicle body 1 calculated by the positioning module 5F can be set in various manners. For example, the current position of the vehicle body 1 can be set in a front end position at center in the left-right direction in the upper end of the vehicle body 1, a rear end position at center in the left-right direction in the upper end of the vehicle body 1, a middle position in the front-rear direction at center in the left-right direction in the upper end of the vehicle body 1, a central position of the vehicle body 1, a center of gravity position of the vehicle body 1, a turning center position in a spin turning state, or the like.

Figure 18:
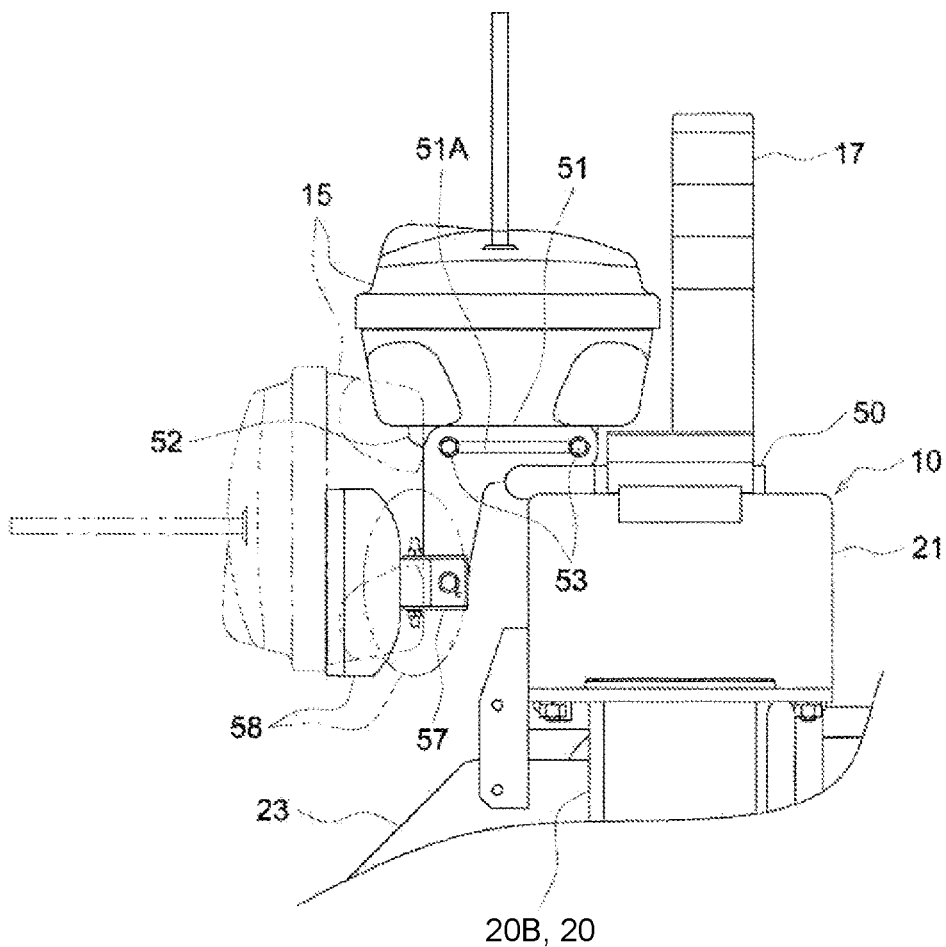
FIG. 18 is a side view of a major portion of an antenna unit illustrating the antenna unit in a use position and a retracted position.

As illustrated in FIGS. 3 to 4, FIG. 8, and FIG. 18, a support member 50 with a U shape in a plan view supporting the front antenna unit 15 is attached to the front cross member 21 of the vehicle body frame 10. As illustrated in FIG. 4 and FIG. 18, the support member 50 includes left and right support plates 51 formed in a downward L shape in a side view. As illustrated in FIG. 18, each of the support plates 51 has a long hole 51A extending in the front-rear direction of the vehicle body at an upper end thereof. Using the long holes 51A, each of left and right brackets 52 provided at the bottom of the front antenna unit 15 is connected to a corresponding one of the support plates 51 via a pair of front and rear bolts 53 or the like. With this configuration, the front antenna unit 15 can be repositioned from a use position above the vehicle body as indicated by a solid line in FIG. 18 to a retracted position in front of the vehicle body as indicated by a double-dotted chain line in FIG. 18 by loosening connection with the support plates 51 via the rear bolts 53 or the like after releasing connection with the support plates 51 via the front bolts 53 or the like.

As illustrated in FIG. 3 and FIGS. 5 to 8, a support member 54 with a U shape in a plan view supporting the rear antenna unit 16 is attached to the rear cross member 22 of the vehicle body frame 10. As illustrated in FIGS. 5 to 7, the support member 54 includes left and right support plates 55 formed in a downward L shape in a side view. Each of the support plates 55 has a long hole 55A extending in the front-rear direction of the vehicle body formed at an upper end thereof. Using the long holes 55A, each of left and right brackets (not illustrated) provided at the bottom of the rear antenna unit 16 is connected to a corresponding one of the support plates 55 via a pair of front and rear bolts 56 or the like. With this configuration, the rear antenna unit 16 can be repositioned from a use position above the vehicle body to a retracted position behind the vehicle body by loosening connection with the support plates 55 via the rear bolts 56 or the like after releasing connection with the support plates 55 via the rear bolts 56 or the like.

As illustrated in FIGS. 3 to 4, FIG. 8, and FIG. 18, left and right head lights 58 are attached to respective front lower portions of the left and right support plates 51 via left and right support metal fittings 57. The left and right support metal fittings 57 are bolted to the left and right support plates 51 such that angle adjustment in the up-down direction is possible. The left and right head lights 58 are bolted to the left and right support metal fittings 57 so as to be pivotally displaceable in the left and right direction. With this configuration, lighting directions of the left and right head lights 58 can be adjusted to the up-down direction and the left-right direction. In addition, as illustrated in FIG. 18, in a case where the front antenna unit 15 is repositioned from the use position indicated by the solid line in FIG. 18 to the retracted position indicated by the double-dotted chain line in FIG. 18, interference between the front antenna unit 15 and the left and right indication lights 58 can be avoided by repositioning the left and right front lights 58 from the use position in the forward direction to the retracted position in a laterally outward direction.

As illustrated in FIGS. 3 to 6, FIG. 8, and FIG. 18, the bracket 59 to which the above-described indication lamp 17 is detachably attached is connected to a left side of the support member 50.

With the above-described configuration, in the work vehicle V, the occurrence of inconvenience in which each of the antenna units 15 and 16 and the indication lamp 17 contacts some other object and is damaged in a case where the work vehicle V is stored in a barn or in a case where the work vehicle V is conveyed by a conveyance vehicle or the like can be suppressed by changing each of respective positions of the antenna units 15 and 16 from the use position to the retracted position and removing the indication lamp 17 from the bracket 59.

As illustrated in FIG. 3 and FIGS. 5 to 8, left and right combination lamps 60 each having a stop lamp and a back lamp are attached to the left and right support plates 55. The left and right combination lamps 60 are arranged in a position where position change of the rear antenna unit 16 described above is not interfered.

As illustrated in FIGS. 3 to 4, FIG. 6, and FIG. 8, on the left side of the vehicle body 1, a power switch 61 that cuts off power supply from the battery 13 to each of electrical components, such as the control units 40 to 43 or the like, is attached to the bracket 59 supporting the indication lamp 17. A step 62 is attached to the left support plate 27 to allow standing ride of the user. The left cover 18 includes an upper cover 18A (see FIG. 3) located in a middle portion of the left cover 18 in the front-rear direction such that the upper cover 18A can pivot to open and close in the up-down direction. In a left inner portion of the vehicle body 1, a cross-rocking type control lever 63 that can be manually operated when the upper cover 18A is held in an open position. The control lever 63 is coupled to the automatic travel control unit 40 via a sensor unit (not illustrated) that detects operation direction and operation amount thereof, or the like. The automatic travel control unit 40 transmits switching of the travel state of the vehicle body 1 to the HST control unit 42 in accordance with the operation direction and operation amount of the control lever 63 transmitted from the sensor unit. The HST control unit 42 controls an operation of each of the HSTs 30 in accordance with the switching of the travel state transmitted from the automatic travel control unit 40.

That is, in the work vehicle V, the user can easily operate the power switch 61 by standing on the step 62. In addition, with the upper cover 18A held in the open position, the user can stand on the step 62 and manually cause the work vehicle V to move and travel by using the control lever 63.

Other Embodiments

Other embodiments of the present invention will be described. Configurations of the other embodiments described below can be applied not only independently but also in combination with the configurations of other different embodiments.

(1) The work vehicle V may be configured in an electric specification including left and right electric motors that independently drive the left and right crawlers 11, instead of the engine 12 and the pair of HSTs 30.

Figure 19:
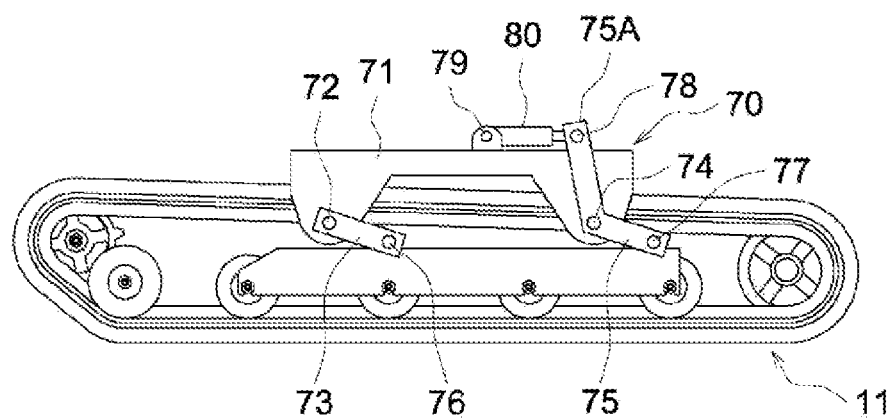
FIG. 19 is a side view of a major portion illustrating a lifted state of a crawler relative to a vehicle frame caused by a lifting and lowering unit.
Figure 20:
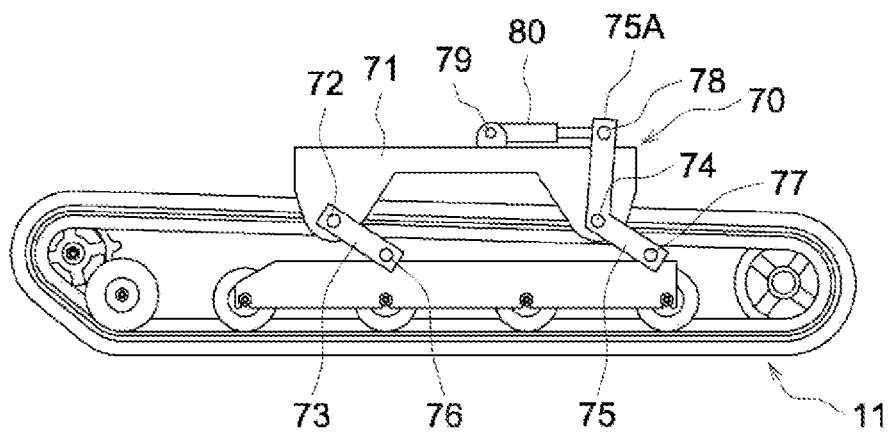
FIG. 20 is a side view of a major portion illustrating a lowered state of the crawler relative to the vehicle frame caused by the lifting and lowering unit.
Figure 21:
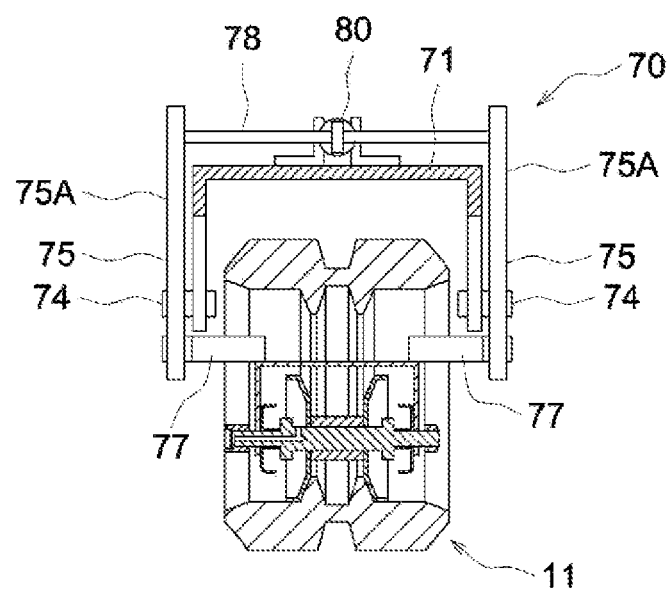
FIG. 21 is a longitudinal cross-sectional rear view of a major portion illustrating a configuration of the lifting and lowering unit.

(2) As illustrated in FIGS. 19 to 21, the work vehicle V may be connected to the vehicle body frame 10 such that one or both of the left and right crawlers 11 are lifted and lowered via the lifting and lowering unit 70.

To describe in detail the configuration of the lifting and lowering unit 70, as illustrated in FIGS. 19 to 21, the lifting and lowering unit 70 has a support member 71 extending in the front-rear direction of the vehicle body 1. The support member 71 is fixed to a lower portion of the vehicle body frame 10. The support member 71 is formed in a gate shape in which the support member 71 extends straddling the crawler 11 in a view in the front-rear direction. Left and right first swing arms 73 that are supported to swing up and down via left and right first support shafts 72 are provided in a front end of the support member 71. Left and right second swing arms 75 that are supported to swing up and down via left and right second support shafts 74 are provided in a rear end of the support member 71. A free end of each of the first swing arms 73 is fitted to a corresponding one of left and right third support shafts 76 extending laterally outward from a front side of the truck frame 20A so as to be relatively rotatable. A free end of each of the second swing arms 75 is fitted to a corresponding one of left and right fourth support shafts 77 extending laterally outward from a rear end of the truck frame 20A so as to be relatively rotatable. Thus, the track frame 20A, the support member 71, the left and right first swing arms 73, and the left and right second swing arms 75 function as parallel links that allow parallel movement of the crawlers 11 relative to the vehicle body frame 10. An operation arm 75A extending upward from a swinging fulcrum of a corresponding one of the left and right second swing arms 75 is integrally formed with a corresponding one of the left and right second swing arms 75. Free ends of the left and right operation arms 75A are connected to each other via a fifth support shaft 78 extending in the left-right direction. A lifting and lowering cylinder 80 used for operating the operation arms 75A of the second swing arms 75 in a swinging manner in the front-rear direction of the vehicle body is provided to bridge between the fifth support shaft 78 and a sixth support shaft 79 provided on an upper portion of the support member 71 to extend in the left-right direction. The lifting and lowering cylinder 80 is arranged within a width of the support member 71 in the left-right direction. For the lifting and lowering cylinder 80, a hydraulic cylinder controlled hydraulically by an operation of a solenoid valve (not illustrated), an electric cylinder, or the like can be employed.

According to this configuration, in a case where the work vehicle V performs contour travel along the target path P in a work site, such as a farm or the like, where a road surface is inclined, the height positions of the left and right crawlers 11 relative to the vehicle body frame 10 can be changed in accordance with an inclination of the road surface, and an attitude of the work vehicle V can be maintained to be a vertical attitude regardless of the inclination of the road surface. Thus, even with the GNSS antennas 5A and 5B arranged at the top of the vehicle body 1 in order to increase the reception sensitivity of each of the GNSS antennas 5A and 5B, misalignment of each of the antenna positions in the left-right direction of the vehicle body with respect to the target path P caused by contour travel can be prevented. As a result, the work vehicle V can be caused to automatically travel in accordance with the target path P even in contour travel in the work site where the road surface is inclined.

In addition, in a case where the gate-type work vehicle V performs a work while traveling straddling trees planted in a plurality of lines, the height positions of the left and right crawlers 11 relative to the vehicle body frame 10 can be changed in accordance with left and right inclinations of the trees relative to the vehicle body 1, and a roll attitude of the work vehicle V can be changed to any attitude in accordance with the left and right inclinations of the trees. As a result, in a case where the work vehicle V performs a work while traveling straddling the trees planted in a plurality of lines, the occurrence of an inconvenience in which the work vehicle V contacts the trees can be suppressed.

Change of heights of the left and right crawlers 11 by an operation of the lifting and lowering unit 70 may be performed by a control operation of the automatic travel control unit 40 based on a user's touch operation on the display device 3A of the mobile communication terminal 3, or may be performed automatically by the control operation of the automatic travel control unit 40 based on detection information from the obstacle detection system 6.

(3) The work vehicle V may be configured such that a width of the vehicle body 1 in the left-right direction can be changed together with a distance between the left and right crawlers 11 in the left-right direction.

(4) The positioning unit 5 may include three or more positioning antennas 5A and 5B and positioning sections 5C and 5D. In this case, the positioning state determination unit (positioning module) 5F may be configured to select the positioning sections 5C and 5D to be used in accordance with the positioning state of each of the positioning sections 5C and 5D or the like.

(5) The positioning unit 5 may include a plurality of inertial measurement devices 5E.

(6) Instead of the configuration in which the positioning module 5F functions as the calculation unit and the positioning state determination unit, the positioning unit 5 may have a configuration including the calculation unit and the positioning state determination unit separately.

Additional Remarks

A first feature configuration of the present invention is a configuration in which a work vehicle includes a positioning unit that uses a satellite positioning system to measure current position and current orientation of a vehicle body, and an automatic travel control unit that executes automatic travel control to cause the vehicle body to automatically travel in accordance with a target path, based on positioning information from the positioning unit, and the positioning unit includes a plurality of positioning antennas installed at different positions on the vehicle body, a plurality of positioning sections that measure the positions of the positioning antennas, a calculation unit that calculates the current position and current orientation of the vehicle body, based on positioning information from the positioning sections, and a positioning state determination unit that determines whether a positioning state of each of the positioning sections is a high-accuracy positioning state, and the positioning state determination unit permits start of the automatic travel control in a case where at least two of the positioning sections are in the high-accuracy positioning state.

According to this configuration, at a stage where the positioning state determination unit permits start of automatic travel control, at least two positioning sections in the high-accuracy positioning state are measuring positions of two positioning antennas (which will be hereinafter occasionally referred to simply as antenna positions) using a satellite positioning system, and the calculation unit calculates the current position and current orientation of the vehicle body, based on the at least two antenna positions measured by the positioning sections in the high-accuracy positioning state.

To additionally describe calculation of the current orientation of the vehicle body by the calculation unit, for example, in a case where the two positioning sections are in the high precision positioning state, the calculation unit first transforms the coordinate system of the two antenna positions measured by the positioning sections in the high-accuracy positioning state into the NED coordinate system with one of the antenna positions as an origin. Next, the calculation unit calculates an inclination of a straight line connecting the antennas with the X axis (north) at 0 degrees from a difference from one of the antenna positions, of the other one of the antenna positions, in an X direction and a difference thereof in a Y direction in the NED coordinate system. The calculation unit also calculates an inclination offset amount between the antennas in a case where the vehicle body is positioned to face the true north, based on a positional relationship between the two positioning antennas on the vehicle body that is known information. Then, the calculation unit calculates the current orientation of the vehicle body from a difference between the calculated inclination of the straight line connecting the antennas and the inclination offset amount between the antennas.

As described above, the positioning unit includes the plurality of positioning antennas and the plurality of positioning sections, and thus, calculation of the current orientation of the vehicle body by the calculation unit is possible even without an orientation sensor or an inertial measurement device, so that, even in a case where the work site of the work vehicle is a farm, such as an orchard or the like, where there are structures, such as metal poles, wires, or the like, or in a case where the work vehicle turns at low speed, the current position and current orientation of the vehicle body can be calculated with high accuracy.

In particular, since the calculation unit calculates the current orientation of the vehicle body, based on at least two antenna positions, it is no longer necessary to obtain a movement vector of the vehicle body in the process as is the case where the current orientation of the vehicle body is calculated from a single antenna position. Therefore, the current orientation of the vehicle body can be calculated with high accuracy even when the vehicle body is turning with a small turning radius and it is difficult to determine a movement vector of the vehicle body or when the vehicle body is stopped and thus it is not possible to determine the movement vector of the vehicle body.

Moreover, the automatic travel control unit cannot start automatic travel control until at least two positioning sections are put in the high-accuracy positioning state, and automatic travel control can be started when the at least two positioning sections are put in the high-accuracy positioning state, so that, at start of automatic travel control, it is possible to cause the work vehicle to automatically travel in accordance with a target path, based on highly accurate current position and current orientation of the vehicle body calculated by the calculation unit.

As a result, it is possible to provide a work vehicle capable of automatically traveling in accordance with a target path with high accuracy regardless of conditions of a work site or a travel state of the work vehicle.

A second feature configuration of the present invention is a configuration in which the positioning unit includes an inertial measurement device that measures the orientation of the vehicle body, and the positioning state determination unit allows, if any one of the positioning sections is in the high-accuracy positioning state, continuation of the automatic travel control even in a case where the number of the positioning sections in the high-accuracy positioning state is reduced during execution of the automatic travel control.

According to this configuration, even in a case where positioning accuracy of some of positioning sections is reduced due to, for example, reduction in the number of positioning satellites radio waves of which can be received by the positioning antennas or reduction in strength of radio waves from positioning satellites caused by deterioration of a surrounding environment, if any one of the positioning sections is in the high-accuracy positioning state, the calculation unit can calculate the current position of the vehicle body with high accuracy, based on the positioning information from the positioning section. In addition, the positioning unit includes an inertial measurement device, and thus, the calculation unit can calculate the highly accurate current orientation of the vehicle body from the highly accurate orientation (absolute orientation) of the vehicle body calculated based on positioning information from the plurality of positioning sections in the high-accuracy positioning state until immediately before the positioning accuracy of the positioning sections is reduced and the orientation (yaw angle change amount) of the vehicle body measured by the inertial measurement device.

Thus, if any one of the positioning sections is in the high-accuracy positioning state, the automatic travel control unit can cause the work vehicle to automatically drive in accordance with the target path, based on the highly accurate current position and current orientation of the vehicle body calculated by the calculation unit.

A third characteristic configuration of the present invention is a configuration in which the target path includes a work path on which vehicle speed is set to predetermined work speed and a turning path on which the vehicle speed is set to turning speed lower than the work speed, and in a case where any one of the positioning sections is in the high-accuracy positioning state, the positioning state determination unit permits continuation of the automatic travel control if the current position of the vehicle body is on the work path and suspends the automatic travel control if the current position of the vehicle body is on the turning path.

According to this configuration, in a case where any one of the positioning sections is in the high-accuracy positioning state, it is necessary to use the orientation of the vehicle body measured by the inertial measurement device in calculating the current orientation of the vehicle body. However, the inertial measurement device has difficulty in maintaining measurement accuracy at low speed, and therefore, considering this point, continuation of the automatic travel control is permitted if the current position of the vehicle body is on a work path with high set speed, and the automatic travel control is suspended if the current position of the vehicle body is on a turning path with low set speed.

That is, in a case where any one of the positioning sections is in the high-accuracy positioning state, if the current position of the vehicle body is on a work path on which the measurement accuracy of the inertial measurement device is high, the automatic travel control by the automatic travel control unit continues. Thus, the automatic travel control unit can cause the work vehicle to automatically travel in accordance with the target path, based on the highly accurate current orientation of the vehicle body calculated by the calculation unit, or the like. If the current position of the vehicle body is on a turning path on which the measurement accuracy of the inertial measurement device is low, the automatic travel control by the automatic travel control unit is suspended. Thus, a risk that the work vehicle deviates from the target path due to automatic travel of the work vehicle caused by the automatic travel control unit, based on the current orientation of the vehicle body calculated by the calculation unit, or the like, with low accuracy.

A fourth feature configuration of the present invention is a configuration in which the plurality of positioning antennas are a pair of front and rear positioning antennas installed in two positions, that is, front and rear positions, in the vehicle body at predetermined intervals.

According to this configuration, the calculation unit calculates the current position and current orientation of the vehicle body with high accuracy, based on the front and rear two antenna positions set on the vehicle body.

Thus, it is possible to calculate the current position and current orientation of the vehicle body with high accuracy while reducing the number of positioning antennas and positioning sections installed and to cause the work vehicle to automatically travel in accordance with the target path with high accuracy.

The invention claimed is:

1. A work vehicle comprising:
a positioning unit that uses a satellite positioning system to measure current position and current orientation of a vehicle body; and
an automatic travel control unit that executes automatic travel control to cause the vehicle body to automatically travel in accordance with a target path, based on positioning information from the positioning unit,
wherein
the positioning unit includes a plurality of positioning antennas installed at different positions on the vehicle body, a plurality of positioning sections that measure the positions of the positioning antennas, a calculation unit that calculates the current position and current orientation of the vehicle body, based on positioning information from the positioning sections, and a positioning state determination unit that determines whether a positioning state of each of the positioning sections is a high-accuracy positioning state, and
the positioning state determination unit permits start of the automatic travel control in a case where at least two of the positioning sections are in the high-accuracy positioning state.

2. The work vehicle according to claim 1, wherein
the positioning unit includes an inertial measurement device that measures the orientation of the vehicle body, and
the positioning state determination unit permits, if any one of the positioning sections is in the high-accuracy positioning state, continuation of the automatic travel control even in a case where the number of the positioning sections in the high-accuracy positioning state is reduced during execution of the automatic travel control.

3. The work vehicle according to claim 2, wherein
the target path includes a work path on which vehicle speed is set to predetermined work speed and a turning path on which the vehicle speed is set to turning speed lower than the work speed, and
in a case where any one of the positioning sections is in the high-accuracy positioning state, the positioning state determination unit permits continuation of the automatic travel control if the current position of the vehicle body is on the work path and suspends the automatic travel control if the current position of the vehicle body is on the turning path.

4. The work vehicle according to claim 1, wherein
the plurality of positioning antennas are a pair of front and rear positioning antennas arranged in two positions, that is, front and rear positions, in the vehicle body at predetermined intervals.

* * * * *